(12) United States Patent
Lee et al.

(10) Patent No.: US 11,921,961 B2
(45) Date of Patent: Mar. 5, 2024

(54) DISPLAY DEVICE

(71) Applicant: SAMSUNG DISPLAY CO., LTD., Yongin-si (KR)

(72) Inventors: Soon Gyu Lee, Yongin-si (KR); Hyun Wook Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 23 days.

(21) Appl. No.: 17/659,958

(22) Filed: Apr. 20, 2022

(65) Prior Publication Data

US 2023/0094957 A1 Mar. 30, 2023

(30) Foreign Application Priority Data

Sep. 28, 2021 (KR) .................. 10-2021-0128097

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 3/0448* (2019.05)

(58) Field of Classification Search
CPC ... G06F 3/0446; G06F 3/0448; G06F 3/04164
USPC ......................................................... 345/50
See application file for complete search history.

(56) References Cited

U.S. PATENT DOCUMENTS

| | | | |
|---|---|---|---|
| 8,947,370 B2 | 2/2015 | An et al. | |
| 9,110,535 B2 | 8/2015 | Lo et al. | |
| 10,373,591 B2 | 8/2019 | Cho et al. | |
| 2012/0319974 A1* | 12/2012 | Kim | G06F 3/0446 345/173 |
| 2013/0113730 A1* | 5/2013 | Lo | G06F 3/04886 345/173 |
| 2015/0185935 A1* | 7/2015 | Jang | G06F 3/04166 345/174 |
| 2017/0329456 A1* | 11/2017 | Leigh | G06F 3/0412 |
| 2019/0317628 A1* | 10/2019 | Liao | G06F 3/04182 |

(Continued)

FOREIGN PATENT DOCUMENTS

| | | |
|---|---|---|
| KR | 10-1726623 | 4/2017 |
| KR | 10-2017-0058507 | 5/2017 |

(Continued)

*Primary Examiner* — Mark Edwards
(74) *Attorney, Agent, or Firm* — F. CHAU & ASSOCIATES, LLC

(57) ABSTRACT

A display device including a non-sensing area and a sensing area with a first sensing area and a second sensing area spaced apart from each other in a first direction, includes a light emitting element emitting light, and a sensor unit including a plurality of first sensor electrodes disposed in the first sensing area and extending in the first direction, a plurality of second sensor electrodes disposed in the second sensing area and extending in the first direction, a plurality of third sensor electrodes disposed in the first sensing area and extending in a second direction different from the first direction, a plurality of fourth sensor electrodes disposed in the second sensing area and extending in the second direction, and a connection pattern disposed in the non-sensing area. The connection pattern electrically connects the plurality of third sensor electrodes to the plurality of fourth sensor electrodes.

18 Claims, 25 Drawing Sheets

(56) References Cited

U.S. PATENT DOCUMENTS

| | | | |
|---|---|---|---|
| 2020/0081562 A1* | 3/2020 | Shi | G06F 3/0446 |
| 2021/0072864 A1 | 3/2021 | Park | |
| 2021/0313401 A1 | 10/2021 | Lee et al. | |
| 2022/0019330 A1* | 1/2022 | Chang | G06F 3/0445 |
| 2022/0326832 A1 | 10/2022 | Lee et al. | |
| 2023/0039953 A1* | 2/2023 | Seger, Jr. | G06F 3/0444 |

FOREIGN PATENT DOCUMENTS

| KR | 10-2021-0029862 | 3/2021 |
|---|---|---|
| KR | 10-2021-0123454 | 10/2021 |
| KR | 10-2022-0140075 | 10/2022 |

* cited by examiner

DISPLAY DEVICE

CROSS-REFERENCE TO RELATED APPLICATION

The present application claims priority under 35 U.S.C. § 119(a) to Korean patent application 10-2021-0128097 filed on Sep. 28, 2021 in the Korean Intellectual Property Office, the entire disclosure of which is herein incorporated by reference.

BACKGROUND

1. Technical Field

The present disclosure generally relates to a display device.

2. Related Art

With the development of information technologies, the importance of a display device which is a communication medium between a user and information increases. Display devices such as a liquid crystal display device and an organic light emitting display device are increasingly used.

A display device may include a display panel for displaying an image and a sensing panel for sensing an object. The sensing panel may be used to detect a touch position.

It is desirable to sufficiently secure a space in which lines provided in the sensing panel are disposed. A sensing panel with a sufficiently high sensitivity may be desirable to increase a satisfaction level with respect to an interface using a user touch input.

SUMMARY

Embodiments provide a display device in which process cost is reduced, and the degree of freedom of a line design is increased.

Embodiments also provide a display device in which power consumption can be reduced when a driving operation is performed.

According to an embodiment of the present invention, a display device including a non-sensing area and a sensing area with a first sensing area and a second sensing area spaced apart from each other in a first direction, includes a light emitting element emitting light, and a sensor unit including a plurality of first sensor electrodes disposed in the first sensing area and extending in the first direction, a plurality of second sensor electrodes disposed in the second sensing area and extending in the first direction, a plurality of third sensor electrodes disposed in the first sensing area and extending in a second direction different from the first direction, a plurality of fourth sensor electrodes disposed in the second sensing area and extending in the second direction, and a connection pattern disposed in the non-sensing area. The connection pattern electrically connects the plurality of third sensor electrodes to the plurality of fourth sensor electrodes.

According to an embodiment of the present invention, a display device including a first sensing area and a second sensing area, includes a light emitting element, (1_1)th sensors and (2_1)th sensors disposed in the first sensing area, (1_2)th sensors and (2_2)th sensors disposed in the second sensing area, and connection patterns electrically connecting the (2_1)th sensors to the (2_2)th sensors, and a division region separating the first sensing area and the second sensing area from each other. When viewed in a plan view, the (1_1)th sensors and the (1_2)th sensors are separated from each other by the division region.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Like reference numerals refer to like elements throughout.

FIG. 1 is a diagram illustrating a display device in accordance with an embodiment of the present disclosure.

FIG. 2 is a schematic sectional view illustrating a stacked structure of the display device in accordance with an embodiment of the present disclosure.

FIG. 3 is a block diagram illustrating a display unit and a display driver in accordance with an embodiment of the present disclosure.

FIG. 4 is a sectional view schematically illustrating a pixel in accordance with an embodiment of the present disclosure.

FIG. 5 is a sectional view schematically illustrating a sensor unit in accordance with an embodiment of the present disclosure.

FIG. 6 is a plan view schematically illustrating a sensor unit in accordance with a first embodiment of the present disclosure.

FIG. 7 is a schematic sectional view taken along line I-I' shown in FIG. 6.

FIG. 8 is a schematic sectional view taken along line II-II' shown in FIG. 6.

FIG. 9 is an enlarged view of area EA1 shown in FIG. 6.

FIG. 10 is a schematic sectional view taken along line III-III' shown in FIG. 9.

FIG. 11 is an enlarged view of area EA2 shown in FIG. 6.

Figure 12:
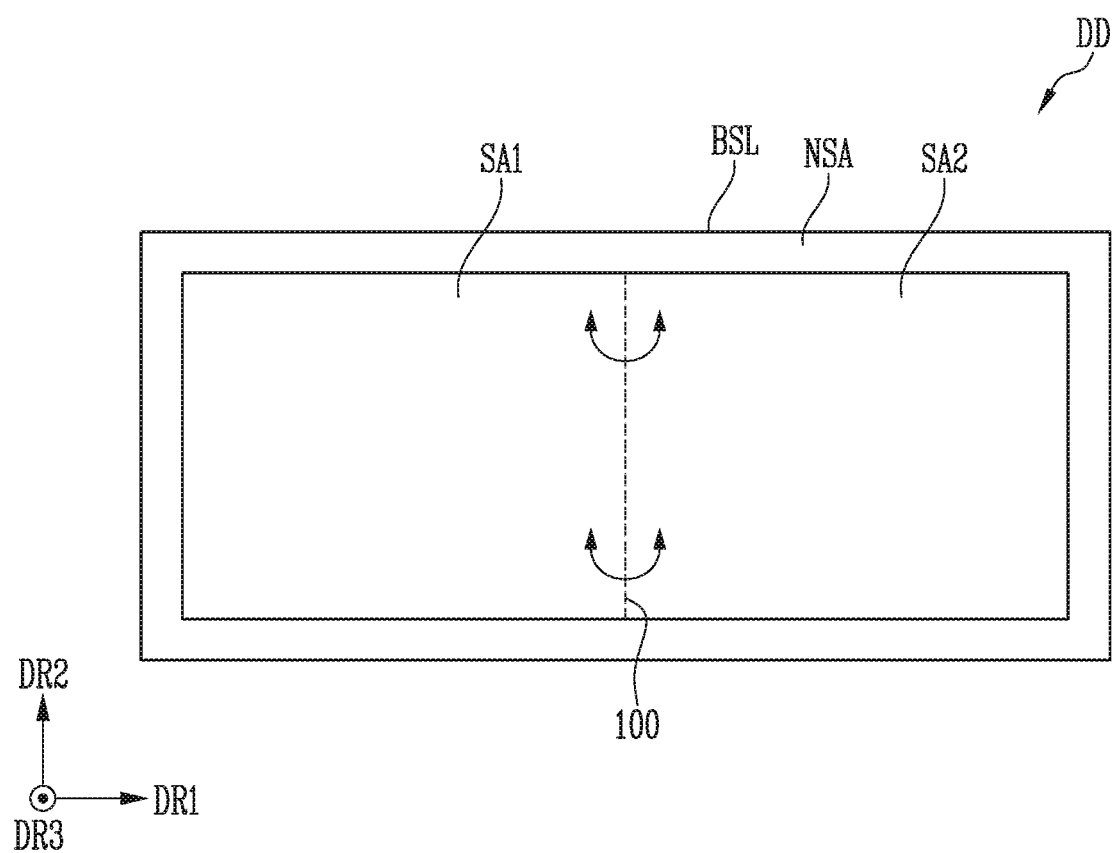

FIG. 12 is a plan view schematically illustrating a display device in accordance with an embodiment of the present disclosure.

Figure 13:
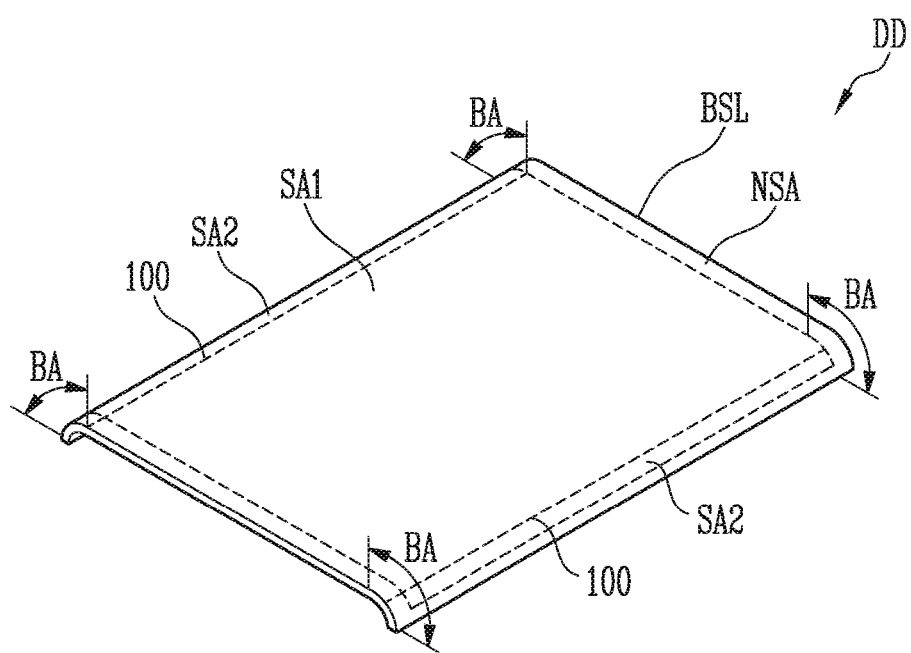

FIG. 13 is a perspective view schematically illustrating a display device in accordance with an embodiment of the present disclosure.

Figure 14:
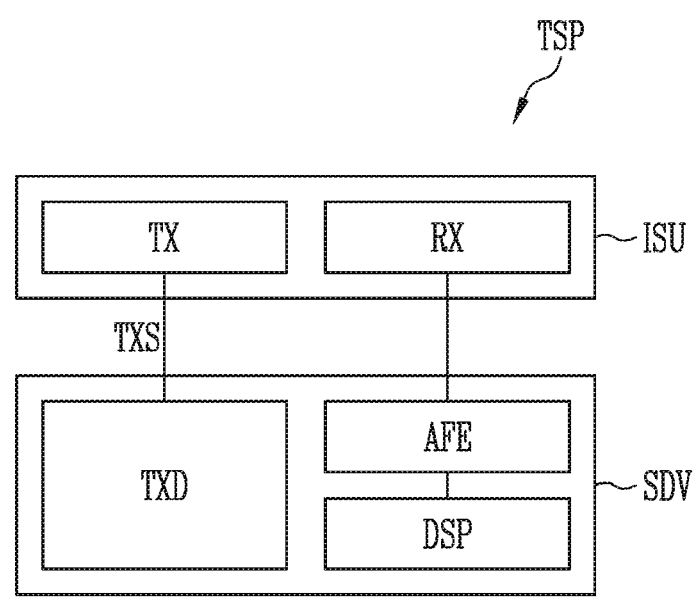

FIG. 14 is a block diagram illustrating a sensor unit in accordance with an embodiment of the present disclosure.

FIGS. 15 to 19 are diagrams illustrating an analog front end in accordance with an embodiment of the present disclosure.

Figure 20:
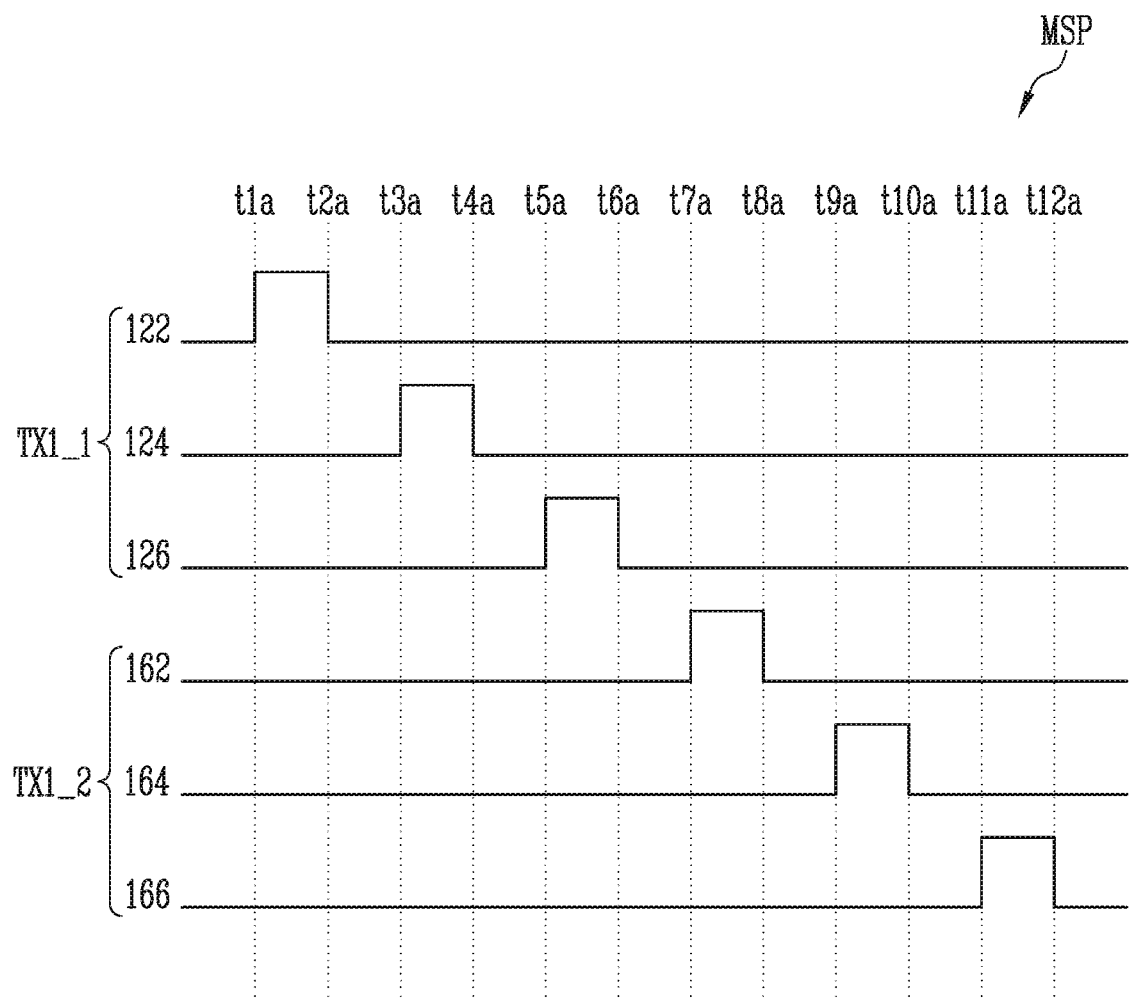

FIG. 20 is a diagram illustrating a first embodiment of a mutual sensing operation.

Figure 21:
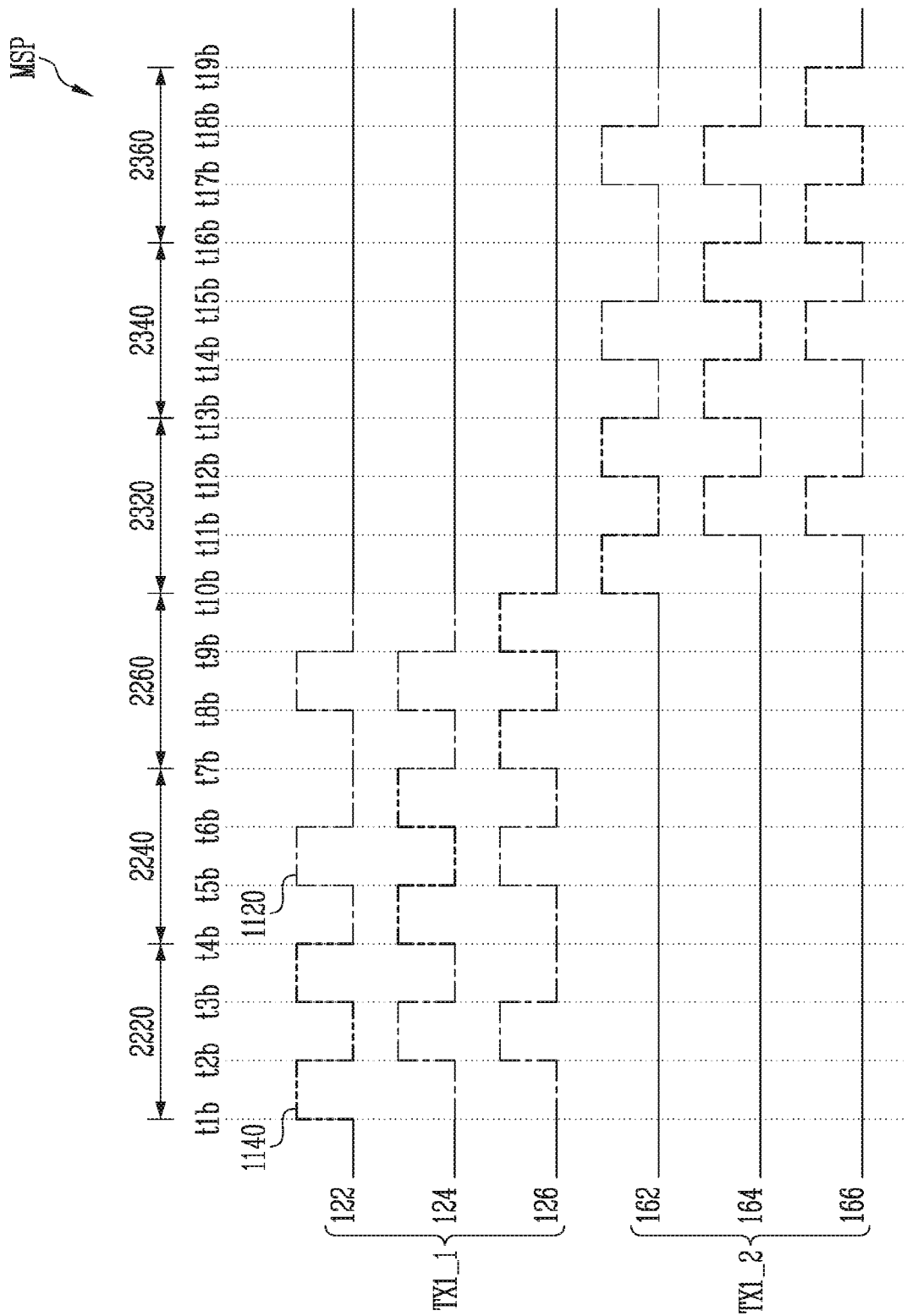

FIG. 21 is a diagram illustrating a second embodiment of the mutual sensing operation.

Figure 22:
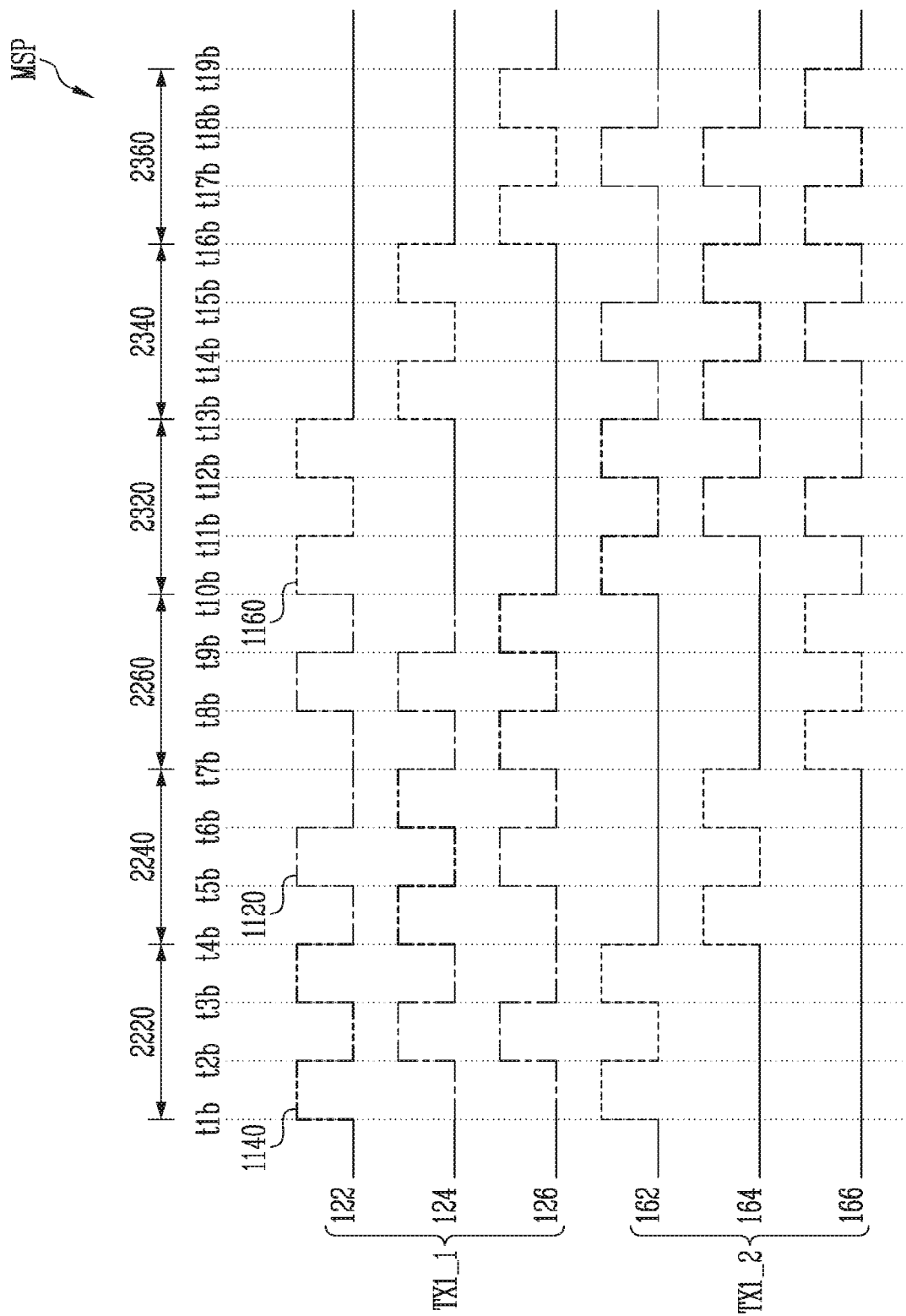

FIG. 22 is a diagram illustrating a third embodiment of the mutual sensing operation.

Figure 23:
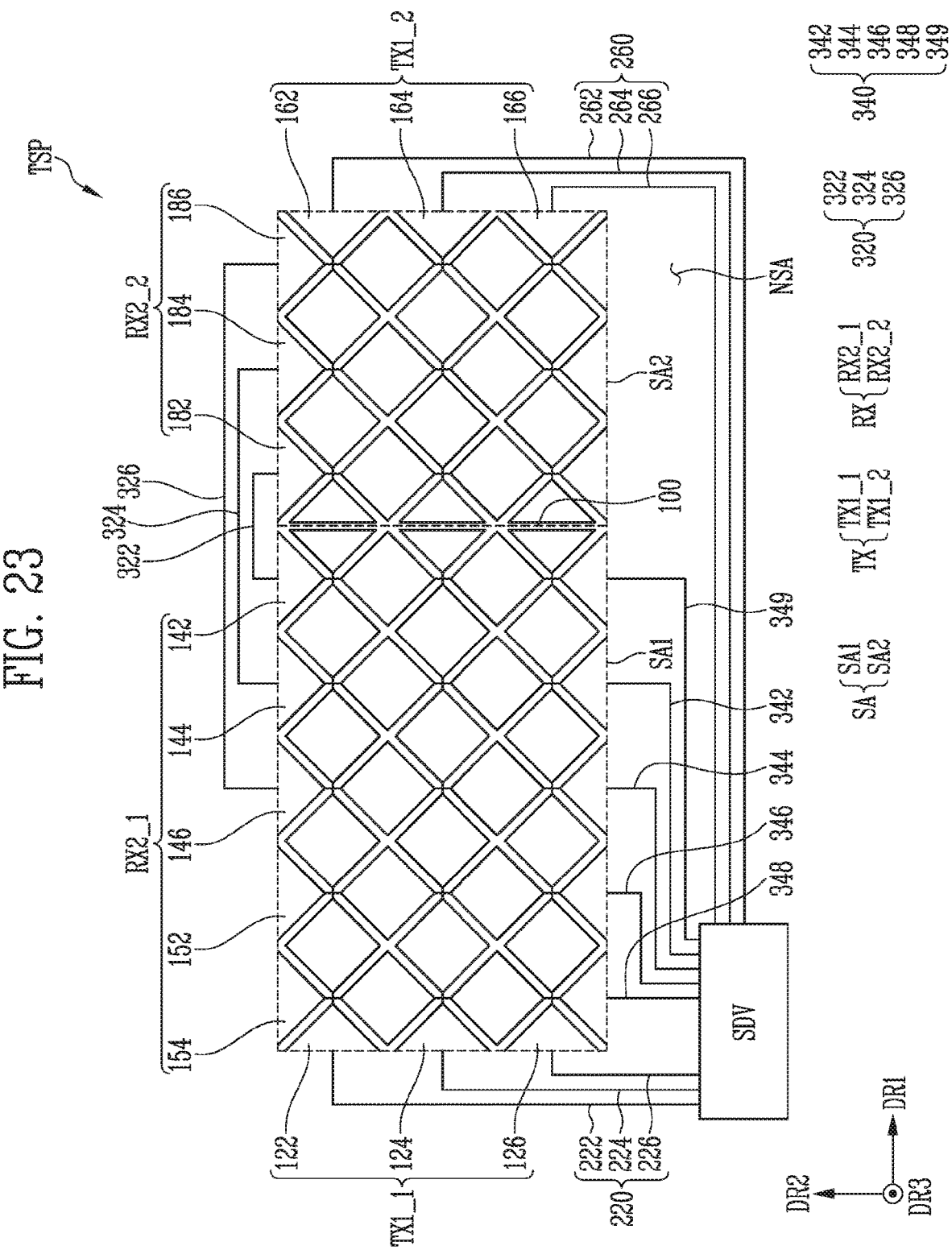

FIG. 23 is a plan view schematically illustrating a sensor unit in accordance with a second embodiment of the present disclosure.

Figure 24:
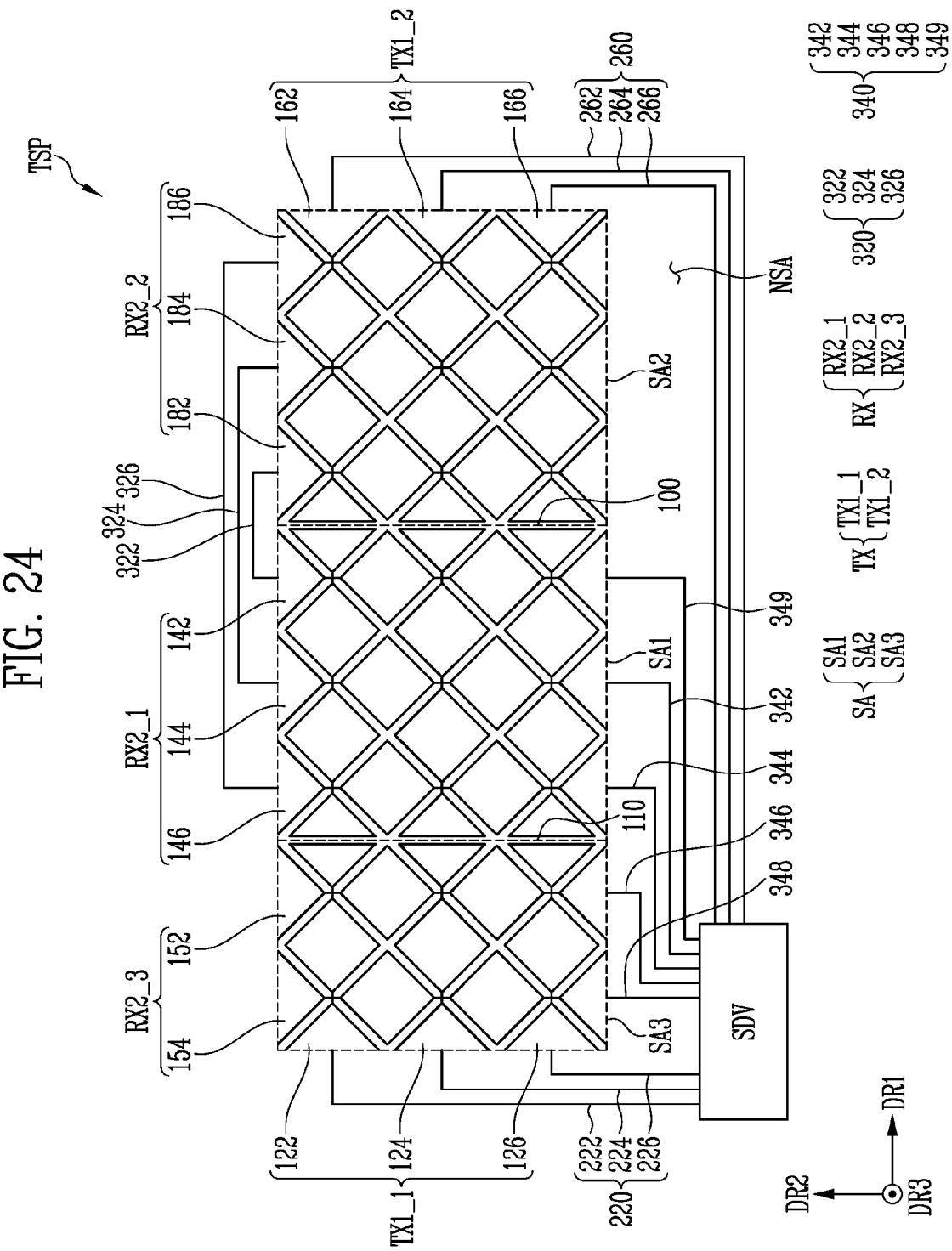

FIG. 24 is a plan view schematically illustrating a sensor unit in accordance with a third embodiment of the present disclosure.

Figure 25:
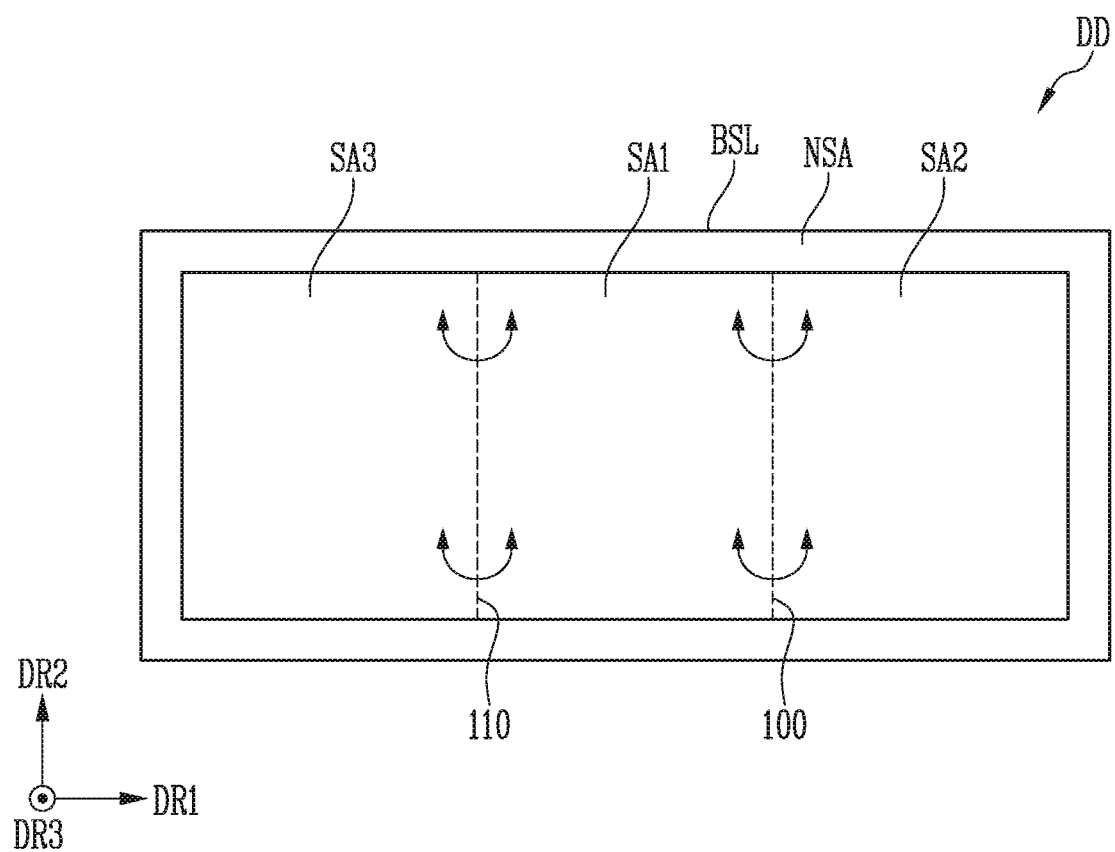

FIG. 25 is a perspective view schematically illustrating a display device in accordance with a third embodiment of the present disclosure.

DETAILED DESCRIPTION

Embodiments disclosed in the present specification are provided only for illustrative purposes and for full understanding of the scope of the present disclosure by those skilled in the art. However, the present disclosure is not limited to the embodiments, and it should be understood that the present disclosure includes modification examples or change examples without departing from the spirit and scope of the present disclosure.

The terms used in the specification have been selected as general terms currently widely used if possible, considering the functions in the present disclosure, but they may depend on the intentions of those skilled in the art, practice, the appearance of new technologies, etc. Specific cases use the terms selected arbitrarily by the applicant and in these cases, their meaning will be described when describing corresponding disclosures. Thus, it should be noted that the terms used in the specification should be construed on the basis of their actual meanings and contents through the specification, not just names thereof.

The drawings attached to the present specification are provided to easily explain the present disclosure, and the shapes shown in the drawings may be exaggerated and displayed as necessary to help understanding of the present disclosure, and thus the present disclosure is not limited to the drawings.

In the present specification, when it is determined that a detailed description of a known configuration or function related to the present disclosure may obscure the gist of the present disclosure, a detailed description thereof will be omitted as necessary.

The present disclosure generally relates to a display device. Hereinafter, a display device in accordance with an embodiment of the present disclosure will be described with reference to the accompanying drawings.

Figure 1:
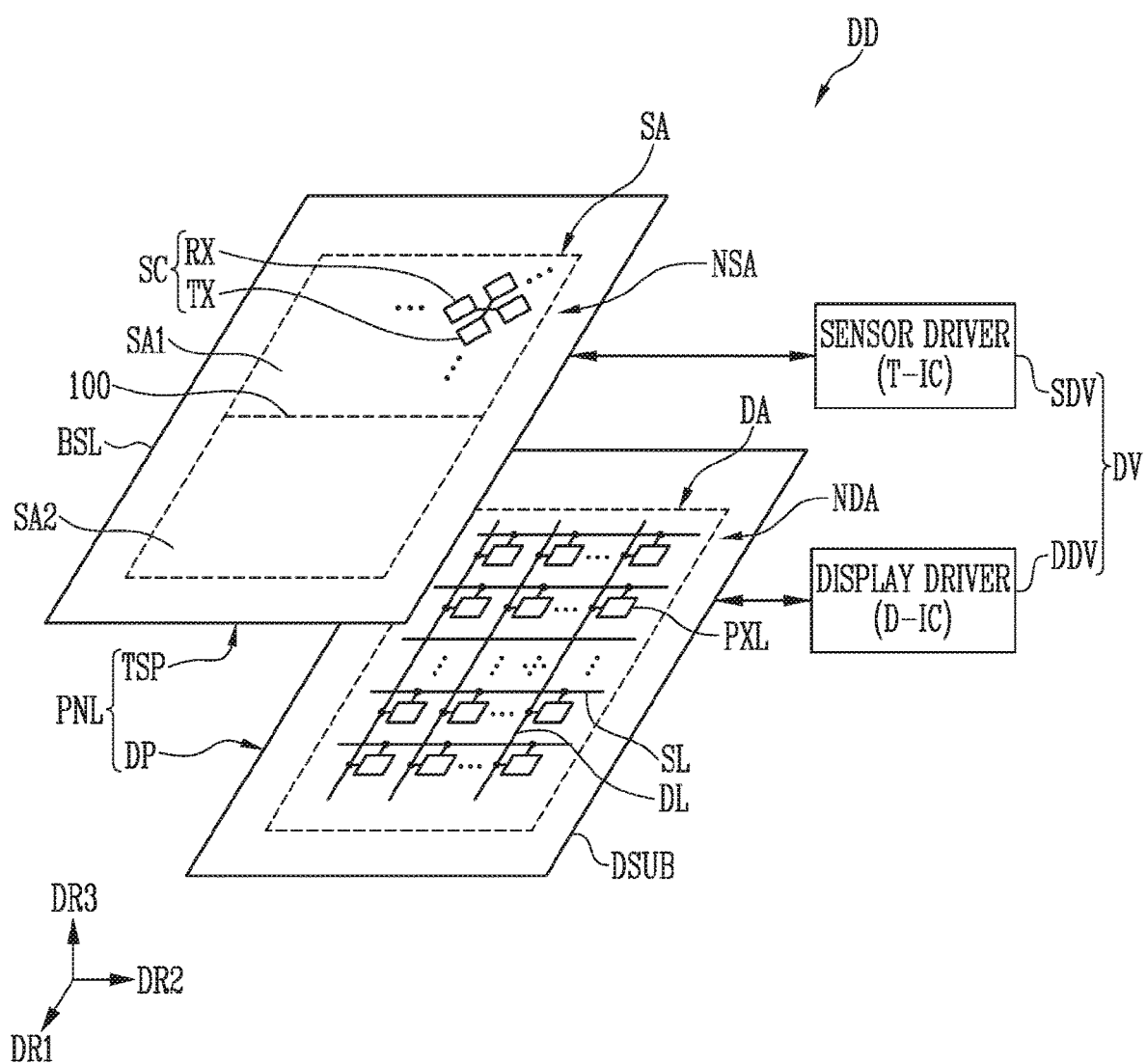

FIG. 1 is a diagram illustrating a display device in accordance with an embodiment of the present disclosure.

The display device DD is configured to provide light. Referring to FIG. 1, the display device DD may include a panel PNL and a driving circuit DV for driving the panel PNL.

The panel 10 may include a display unit DP for displaying an image and a sensor unit TSP for sensing a touch, a pressure, a fingerprint, hovering, etc. In some embodiments, the sensor unit TSP may be designated as a touch sensor.

The panel PNL may include pixels PXL and sensors SC overlapping with at least some of the pixels PXL. In accordance with an embodiment, the pixels PXL may display an image in units of display frame periods. The sensors SC may sense an input of a user in units of sensing frame periods. The sensing frame period and the display frame period may be independent from each other, and be different from each other. The sensing frame period and the display frame period may be synchronized with each other, and may not be synchronized with each other.

In accordance with an embodiment, the sensors SC may include a first sensor TX providing a first sensing signal and a second sensor RX providing a second sensing signal. In some embodiments, the first sensor TX and the second sensor RX may form a capacitor in a mutual capacitive touch sensor. The capacitance in the mutual capacitive touch sensor may change by a finger touch, for example, which is measured to detect the finger touch. However, in some embodiments (e.g., according to a self-capacitance method or in a self-capacitive touch sensor), the sensors SC may be configured as one kind of sensors without distinguishing the first sensor TX and the second sensor RX from each other. Each sensor SC and a finger (i.e., a ground potential) may form a capacitance, and the capacitance between the finger and the sensor SC may be measured to detect touch. For the brevity of description, each sensor such as the first sensor TX and the second sensor RX in a mutual capacitive sensor is referred to as "a sensor", but it may be referred to as "a sensor electrode". For the brevity of description, each sensor SC in a self-capacitive touch sensor is referred to as "a sensor", but it may be referred to as "a sensor electrode". The present invention is not limited thereto, and may apply to various touch sensors.

The driving circuit DV may include a display driver DDV for driving the display unit DP and a sensor driver SDV for driving the sensor unit TSP.

In accordance with an embodiment, the display unit DP and the sensor unit TSP may be manufactured separately from each other and then be disposed (or coupled) such that the display unit DP and the sensor unit TSP overlap with each other at least one area. However, in some embodiments, the display unit DP and the sensor unit TSP may be integrally manufactured. For example, the sensor unit TSP may be formed directly on at least one substrate (e.g., an upper substrate and/or a lower substrate of the display unit DP, or a thin film encapsulation (TFE) (see FIG. 4)), or another insulating layer or one of various types of functional layers (e.g., an optical layer or a protective layer), which constitutes the display unit DP.

Although a case where the sensor unit TSP is disposed on a front surface (e.g., an upper surface on which an image is displayed) of the display unit DP is illustrated in FIG. 1, the position of the sensor unit TSP is not limited thereto. In some embodiments, the sensor unit TSP may be disposed on a rear surface or both surfaces of the display unit DP. In some embodiments, the sensor unit TSP may be disposed in at least one edge area of the display unit DP.

The display unit DP may include a display substrate DSUB and the pixels PXL provided in the display substrate DSUB. The pixels PXL may be disposed in a display area DA.

The display substrate DSUB may include the display area DA in which an image is displayed and a non-display area NDA other than the display area DA. In some embodiments, the display area DA may be disposed in a central region of the display unit DP, and the non-display area NDA may be disposed in an edge area of the display unit DP to surround the display area DA.

The display substrate DSUB may be a rigid substrate or a flexible substrate, and the material or property of the display substrate DSUB is not particularly limited. For example, the display substrate DSUB may be a rigid substrate made of glass or tempered glass, or a flexible substrate configured with a thin film made of plastic or metal.

Scan lines SL and data lines DL, and the pixels PXL connected to the scan lines SL and the data lines DL are disposed in the display area DA. Pixels PXL are selected by a scan signal having a turn-on level, which is supplied from the scan lines SL, to be supplied with a data signal from the data lines DL, and emit light with a luminance corresponding to the data signal. Accordingly, an image corresponding to the data signal is displayed in the display area DA.

However, in the present disclosure, the structure of the pixels PXL and a driving method thereof are not particularly limited. For example, each of the pixels PXL may be implemented as a pixel employing various structures and/or various driving methods.

Various types of lines and/or a built-in circuit, connected to the pixels PXL of the display area DA may be disposed in the non-display area NDA. For example, a plurality of lines for supplying various power sources and various control signals to the display area DA may be disposed in the non-display area NDA. A scan driver (see '13' shown in FIG. 3) may be further disposed in the non-display area NDA.

The sensor unit TSP may include a base layer BSL and a plurality of sensors SC formed on the base layer BSL. The sensors SC may be disposed in a sensing area SA on the base layer BSL.

The base layer BSL may include the sensing area SA configured to sense a touch input and a non-sensing area NSA at the periphery of the sensing area SA. In some embodiments, the sensing area SA may be disposed to overlap at least one area of the display area DA. For example, the sensing area SA may be set as an area corresponding to the display area DA (e.g., an area overlapping the display area DA), and the non-sensing area NSA may be set as an area corresponding to the non-display area NDA (e.g., an area overlapping the non-display area NDA). When a touch input is provided on the display area DA, the touch input may be detected through the sensor unit TSP.

In accordance with an embodiment, the sensing area SA may include a plurality of sensing areas. For example, the sensing area SA may include a first sensing area SA1 and a second sensing area SA2. The first sensing area SA1 and the second sensing area SA2 may be spaced apart from each other in a first direction DR1.

The base layer BSL may be a rigid or flexible substrate. The base layer BSL may be configured with at least one insulating layer. The base layer BSL may be a transparent substrate or a translucent substrate, but the present disclosure is not limited thereto. In the present disclosure, the material and property of the base layer BSL is not particularly limited. For example, the base layer BSL may be a rigid substrate configured with glass or tempered glass, or a flexible substrate configured with a thin film made of plastic or metal. In some embodiments, at least one substrate (e.g., the display substrate DSUB, an encapsulation substrate, and/or a thin film encapsulation) constituting the display unit DP or, at least one insulating layer or at least one functional layer, disposed at the inside and/or an outer surface of the display DP may be used as the base layer BSL.

The sensing area SA is set as an area configured to react with a touch input (i.e., an active area of sensors). In some embodiments, sensors SC for sensing a touch input may be disposed in the sensing area SA. In some embodiments, the sensors SC may include first sensors TX and second sensors RX.

In accordance with an embodiment, each of the first sensors TX may extend in the first direction DR1. The first sensors TX may be arranged in a second direction DR2. The second direction DR2 may be different from the first direction DR1. For example, the second direction DR2 may be a direction orthogonal to the first direction DR1. Each of the first sensors TX may have a form in which first cells, i.e., cell electrodes, (see 'C1' shown in FIG. 9) having a relatively wide area and first bridges (see 'B1' shown in FIG. 9) having a relatively narrow area. Each first bridge may connect corresponding two adjacent first cells with each other. Although a case where each of the first cells C1 has a diamond shape is illustrated in FIG. 1, each of the first cells C1 may be configured in various conventional shapes including a circular shape, a quadrangular shape, a triangular shape, or a mesh shape. The first bridges B1 may be formed in a layer (i.e., a level) different from a layer of the first cells C1, to electrically connect adjacent first cells C1 with each other. In some embodiments, the first bridges B1 may be integrally formed with the first cells C1 on the same layer as the first cells C1.

For example, each of the second sensors RX may extend in the second direction DR2. The second sensors RX may be arranged in the first direction DR1. Each of the second sensors RX may have a form in which second cells (see 'C2' shown in FIG. 9) having a relatively wide area and second bridges (see 'B' shown in FIG. 9) having a relatively narrow area are connected with each other. Although a case where each of the second cells C2 has a diamond shape is illustrated in FIG. 1, each of the second cells C2 may be configured in various conventional shapes including a circular shape, a quadrangular shape, a triangular shape, or a mesh shape. For example, the second bridges B2 may be integrally formed with the second cells C2 on the same layer as the second cells C2. In some embodiments, the second bridges B2 may be formed in a layer different from that of the second cells C2, to electrically connect adjacent second cells C2 with each other.

In some embodiments, each of the first sensors TX and the second sensors RX may include or may be formed of at least one of a metal material, a transparent conductive material, and various other conductive materials to be electrically conductive. Each of the first sensors TX and the second sensors RX may be configured as a single layer or a multi-layer, and its sectional structure is not particularly limited.

In some embodiments, sensor lines for electrically connecting the sensors TX and RX to the sensor driver SDV may be concentrically disposed in the non-sensing area NSA of the sensor unit TSP.

The driving circuit DV may include the display driver DDV for driving the display unit DP and the sensor driver SDV for driving the sensor unit TSP. In an embodiment, the display driver DDV and the sensor driver SDV may be configured as Integrated Chips (ICs) separate from each other. In some embodiments, at least a portion of the display driver DDV and at least a portion of the sensor driver SDV may be integrated together in one IC.

The display driver DDV is electrically connected to the display unit DP to drive the pixels PX. For example, the display device DDV may include a data driver (see '12' shown in FIG. 3) and a timing controller (see '11' shown in FIG. 3), and the scan driver 13 may be separately mounted in the non-display area NDA of the display unit DP. In some embodiments, the display driver DDV may include the whole or at least a portion of the data driver 12, the timing controller 11, and the scan driver 13.

The sensor driver SDV is electrically connected to the sensor unit TSP to drive the sensor unit TSP. The sensor driver SDV may include a driving signal generator (see 'TXD' shown in FIG. 14), analog front ends (see 'AFE' shown in FIG. 14), and a signal processor (see 'DSP' shown in FIG. 14). Individual components of the sensor driver SDV may be integrated in one IC, but the present disclosure is not limited thereto.

Figure 2:
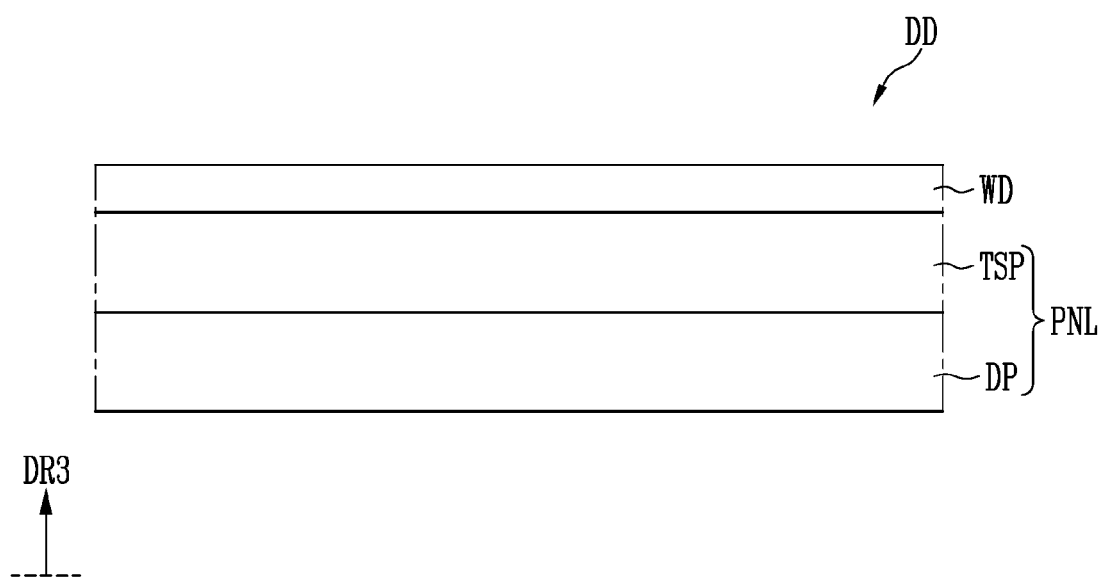

FIG. 2 is a schematic sectional view illustrating a stacked structure of the display device in accordance with an embodiment of the present disclosure.

Referring to FIG. 2, the sensor unit TSP may be disposed (or stacked) on the display unit DP, and a window WD may be disposed (or stacked) on the sensor unit TSP (or the panel PNL).

The display unit DP may output visual information (e.g., an image). In an example, the kind of the display unit DP is not particularly limited. For example, the display unit DP may be implemented as a self-luminescent display panel such as an organic light emitting display panel. However, when the display unit DP is implemented as a self-luminescent display panel, each pixel is not limited to a pixel including an organic light emitting element. For example, a light emitting element of each pixel may be configured as various self-luminescent elements such as an organic light emitting diode, an inorganic light emitting diode, and a quantum dot/well light emitting diode. A plurality of light emitting elements may be provided in a plurality of pixels, respectively. The plurality of light emitting elements may be connected in series, parallel, series/parallel, etc. In some embodiments, the display unit DP may be implemented as a non-light emitting display panel such as a liquid crystal display panel. When the display unit DP is implemented as a non-light emitting display panel, the display device DD may additionally include a light source such as a back-light unit.

Hereinafter, for convenience of description, an embodiment in which the display unit DP is implemented as an organic light emitting display panel will be described.

The sensor unit TSP may acquire information on an input provided from a user. The sensor unit TSP may recognize a touch input. The sensor unit TSP may recognize a touch input by using a capacitive sensing method. The sensor unit TSP may sense a touch input by using a mutual capacitance method or may sense a touch input by using a self-capacitance method.

Hereinafter, an embodiment in which the sensor unit TSP senses a touch input by using the mutual capacitance method will be described.

The window WIN is a protective member disposed at a module that corresponds to an outermost portion of the display device DD, and may be substantially a transparent substrate. In some embodiments, the window WIN may have a multi-layered structure selected from a glass substrate, a plastic film, and a plastic substrate. The window WIN may include or may be formed of a rigid material or a flexible material, and the material constituting the window WIN is not particularly limited.

Although not shown in the drawing, the display device DD may further include a polarizing plate (or another kind of anti-reflection layer) for preventing reflection of external light between the window WIN and the sensor unit TSP.

Hereinafter, a display unit DP in accordance with an embodiment of the present disclosure will be described with reference to FIGS. 3 and 4.

Figure 3:
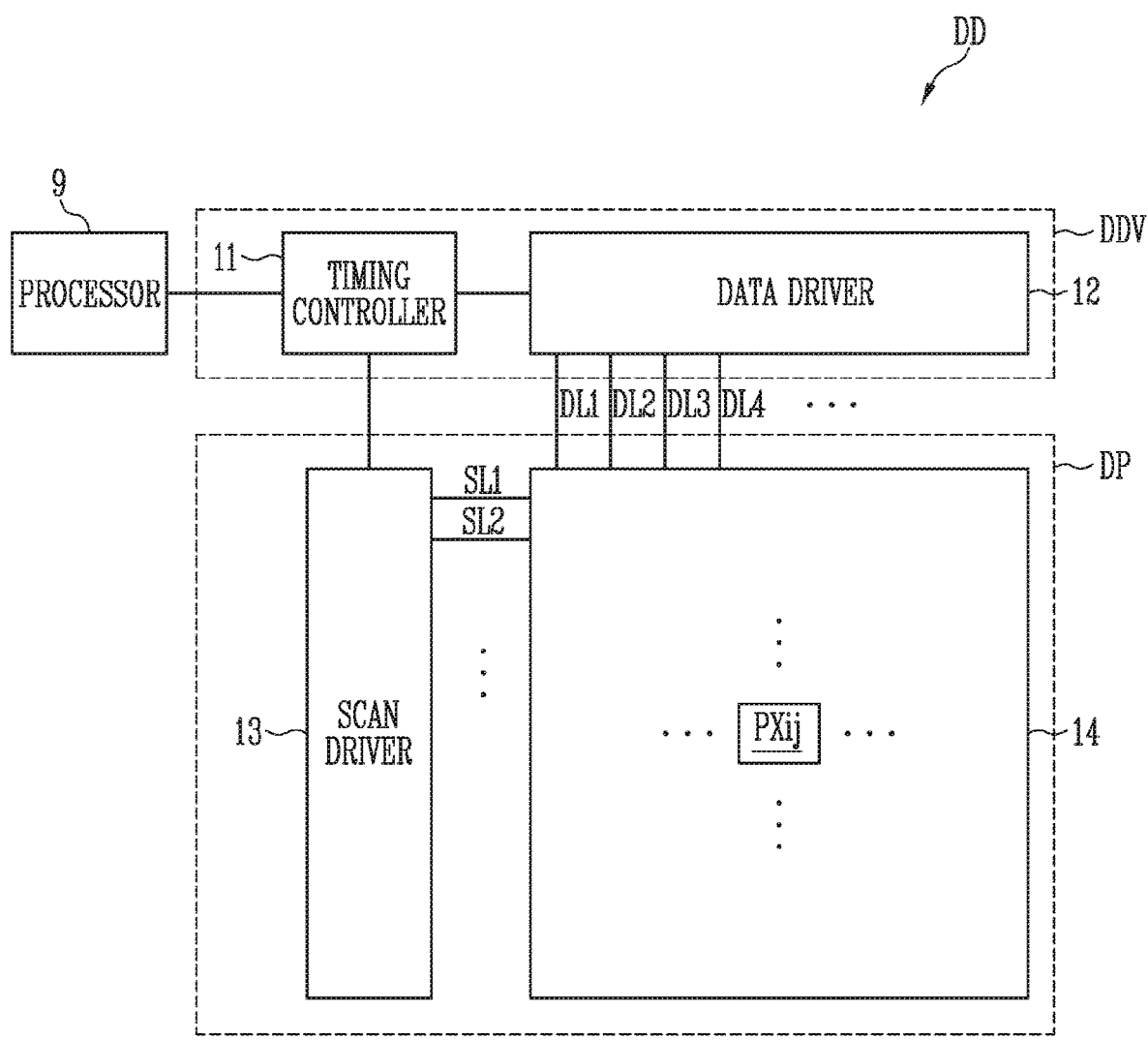

FIG. 3 is a block diagram illustrating a display unit and a display driver in accordance with an embodiment of the present disclosure.

Referring to FIG. 3, the display device DD may include a processor 9 for controlling the display driver DDV. The display driver DDV may include a data driver 12 and a timing controller 11, and the display unit DP may include a scan driver 13. However, as described above, whether functional units are to be integrated in one IC, to be integrated in a plurality of ICs, or to be mounted on the display substrate DSUB may be variously configured according to specifications of the display device DD.

The timing controller 11 may receive grayscales for each display frame period and timing signals from a processor 9. The processor 9 may correspond to at least one of a Graphics Processing Unit (GPU), a Central Processing Unit (CPU), and an Application Processor (AP). The timing signals may include a vertical synchronization signal, a horizontal synchronization signal, or a data enable signal.

The data driver 12 may generate data voltages to be provided to data lines DL1, DL2, DL3, DL4, . . . by using the grayscales and a data control signal, which are received from the timing controller 11.

The scan driver 13 may generate scan signals to be provided to scan lines SL1, SL2, by using a clock signal, or a scan start signal, which are received from the timing controller 11. The scan driver 13 may sequentially supply the scan signals having a pulse of a turn-on level to the scan lines SL1, SL2, . . . . For example, the scan driver 13 may supply the scan signals having the turn-on level to the scan line in a cycle corresponding to that of the horizontal synchronization signal during an active period in which grayscales are supplied. The scan driver 13 may include scan stages configured in the form of shift registers. The scan driver 13 may generate the scan signals in a manner that sequentially transfers the scan start signal in the form of a pulse of the turn-on level to a next scan stage under the control of the clock signal.

A pixel unit 14 includes pixels PXL. Each of the pixels PXL may be connected to a corresponding data line and a corresponding scan line. For example, an $ij_{th}$ pixel $Px_{ij}$ as any one of the pixels PXL may be connected to an $i_{th}$ scan line and a $j_{th}$ data line. The pixels PXL may include first pixels emitting light of a first color, second pixels emitting light of a second color, and third pixels emitting light of a third color. The first color, the second color, and the third color may be different colors from each other. For example, the first color may be one color among red, green, and blue, the second color may be one color, except the first color, among red, green, and blue, and the third color may be the other color, except the first color and the second color, among red, green, and blue. Magenta, cyan, and yellow instead of red, green, and blue may be used as the first to third colors, respectively.

Figure 4:
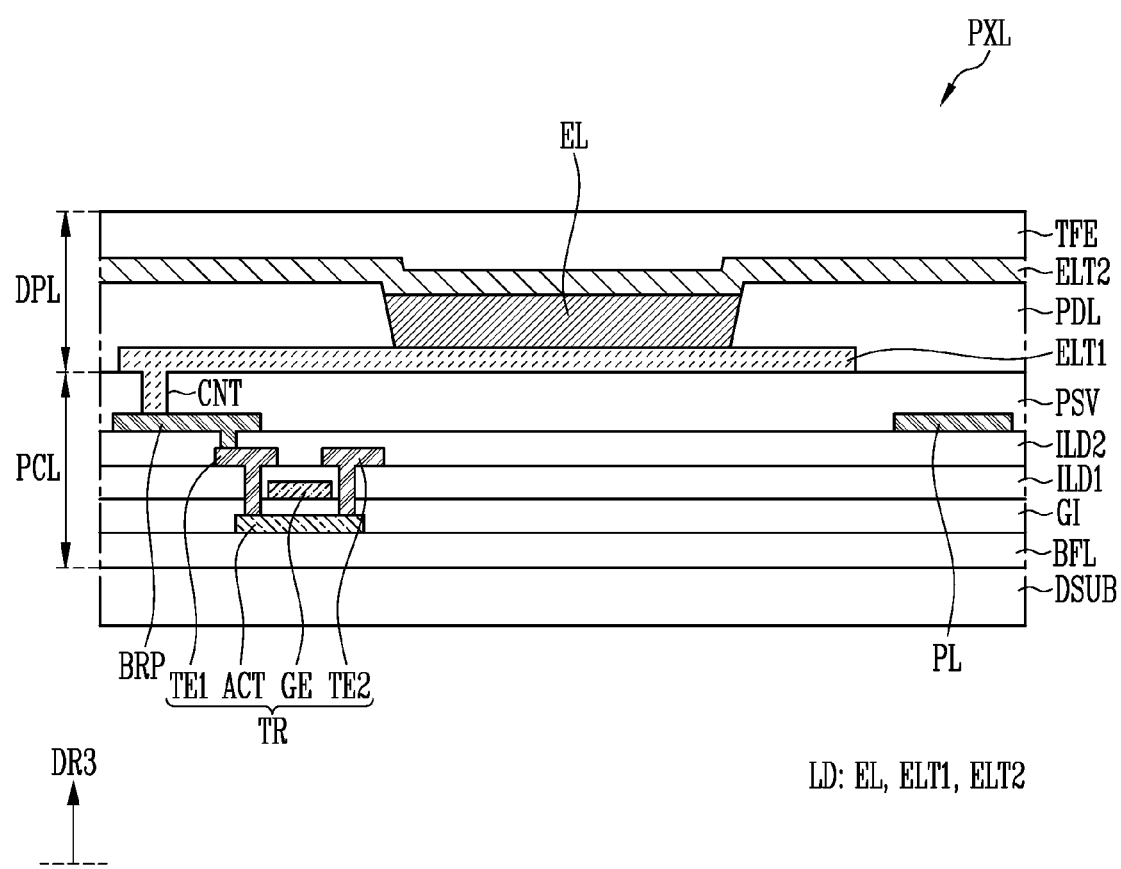

FIG. 4 is a sectional view schematically illustrating a pixel in accordance with an embodiment of the present disclosure. FIG. 4 is an embodiment in which the display unit DP is provided as an organic light emitting display panel, and schematically illustrates a sectional structure of any one of the above-described pixels PXL.

Referring to FIG. 4, the pixel PXL may include a display substrate DSUB, a pixel circuit layer PCL, and a display element layer DPL.

The display substrate DSUB may provide an area in which the pixel circuit layer PCL and the display element layer DPL are disposed. The display substrate DSUB may form (or constitute) a base member of the pixel PXL. The display substrate DSUB may be a rigid substrate or a flexible substrate, but is not limited to a specific example.

The pixel circuit layer PCL may be provided on the display substrate DSUB. The pixel circuit layer PCL may include a buffer layer BFL, a transistor TR, a gate insulating layer GI, a first interlayer insulating layer ILD1, a second interlayer insulating layer ILD2, a bridge pattern BRP, a power line PL, a protective layer PSV, and a contact part CNT.

The buffer layer BFL may be located on the display substrate DSUB. The buffer layer BFL may prevent an impurity from being diffused from the outside. The buffer layer BFL may include or may be formed of at least one of silicon nitride ($SiN_x$), silicon oxide ($SiO_x$), silicon oxynitride ($SiO_xN_y$), and metal oxide such as aluminum oxide ($AlO_x$).

The transistor TR may be a thin film transistor. In accordance with an embodiment, the transistor TR may be a driving transistor.

The transistor TR may be electrically connected to a light emitting element LD. The transistor TR may be electrically connected to the bridge pattern BRP.

The transistor TR may include an active layer ACT, a first transistor electrode TE1, a second transistor electrode TE2, and a gate electrode GE.

The active pattern ACT may be a semiconductor layer. The active layer ACT may be disposed on the buffer layer BFL. The active layer ACT may include or may be formed of at least one of poly-silicon, Low Temperature Polycrystalline Silicon (LTPS), amorphous silicon, and an oxide semiconductor.

The active pattern ACT may include a first contact region in contact with the first transistor electrode TE1 and a second contact region contacting the second transistor electrode TE2. The first contact region and the second contact region may correspond to a semiconductor pattern doped with an impurity. A region between the first contact region and the second contact region may be a channel region. The channel region may correspond to an intrinsic semiconductor pattern undoped with the impurity doped in the first and second contact regions.

The gate electrode GE may be disposed on the gate insulating layer GI. A position of the gate electrode GE may correspond to that of the channel region of the active pattern ACT. For example, the gate electrode GE may be disposed on the channel region of the active pattern ACT with the gate insulating layer GI interposed therebetween.

The gate insulating layer GI may be disposed over the active pattern ACT. The gate insulating layer GI may include or may be formed of an inorganic material. In an example, the gate insulating layer GI may include or may be formed of at least one of silicon nitride ($SiN_x$), silicon oxide ($SiO_x$), silicon oxynitride ($SiO_xN_y$), and aluminum oxide ($AlO_x$).

The first interlayer insulating layer ILD1 may be located over the gate electrode GE. Like the gate insulating layer GI, the first interlayer insulating layer ILD1 may include or may be formed of at least one of silicon nitride ($SiN_x$), silicon oxide ($SiO_x$), silicon oxynitride ($SiO_xN_y$), and aluminum oxide ($AlO_x$).

The first transistor electrode TE1 and the second transistor electrode TE2 may be located on the first interlayer insulating layer ILD1. The first transistor electrode TE1 may be in contact with the first contact region of the active pattern ACT while penetrating the gate insulating layer GI and the first interlayer insulating layer ILD1, and the second transistor electrode TE2 may be in contact with the second contact region of the active pattern ACT while penetrating the gate insulating layer GI and the first interlayer insulating layer ILD1. In an example, the first transistor electrode TE1 may be a drain electrode, and the second transistor electrode TE2 may be a source electrode. However, the present disclosure is not limited thereto.

The second interlayer insulating layer ILD2 may be located over the first transistor electrode TE1 and the second transistor electrode TE2. Like the first interlayer insulating layer ILD1 and the gate insulating layer GI, the second interlayer insulating layer ILD2 may include or may be formed of an inorganic material. The inorganic material may include or may be formed of at least one of the materials exemplified as the material constituting the first interlayer insulating layer ILD1 and the gate insulating layer GI, e.g., silicon nitride ($SiN_x$), silicon oxide ($SiO_x$), silicon oxynitride ($SiO_xN_y$), and aluminum oxide ($AlO_x$).

The bridge pattern BRP may be disposed on the second interlayer insulating layer ILD2. The bridge pattern BRP may be connected to the first transistor electrode TE1 through a contact hole penetrating the second interlayer insulating layer ILD2. The bridge pattern BRP may be electrically connected to a first electrode ELT1 through the contact part CNT formed in the protective layer PSV.

The power line PL may be disposed on the second interlayer insulating layer ILD2. The power line PL may be electrically connected to a second electrode ELT2 through the other contact part (not shown) formed in the protective layer PSV.

The protective layer PSV may be located on the second interlayer insulating layer ILD2. The protective layer PSV may cover the bridge pattern BRP and the power line PL. The protective layer PSV may be provided in a form including an organic insulating layer, an inorganic insulating layer, or an organic insulating layer disposed on an inorganic insulating layer, but the present disclosure is not limited thereto. In accordance with an embodiment, the contact part CNT connected to one region of the bridge pattern BRP and the other contact part connected to one region of the power line PL may be formed in the protective layer PSV.

The display element layer DPL may be disposed on the pixel circuit layer PCL. The display element layer DPL may include the first electrode ELT1, the light emitting element LD, a pixel defining layer DPL, the second electrode ELT2, and a thin film encapsulation TFE.

In accordance with an embodiment, the light emitting element LD may be disposed in an area defined by the pixel defining layer PDL. One surface of the light emitting element LD may be connected to the first electrode ELT1, and the other surface of the light emitting element LD may be connected to the second electrode ELT2.

The first electrode ELT1 may be an anode electrode of the light emitting element LD, and the second electrode ELT2 may be a common electrode (or cathode electrode) of the light emitting element LD. In accordance with an embodiment, the first electrode ELT1 and the second electrode ELT2 may include or may be formed of a conductive material. For example, the first electrode ELT1 may include or may be formed of a reflective conductive material, and the second electrode ELT2 may include a transparent conductive material. However, the present disclosure is not limited thereto.

In accordance with an embodiment, the light emitting element LD may have a multi-layered thin film structure including a light generation layer. The light emitting element LD may include a hole injection layer for injecting holes, a hole transport layer for increasing a hole recombination opportunity by suppressing movement of electrons which are excellent in transportability of holes and are not combined in a light generation layer, the light generation layer for emitting light by recombination of the injected electrons and holes, a hole blocking layer for suppressing the movement of the holes that are not combined in the light generation layer, an electron transport layer for smoothly transporting the electrons to the light generation layer, and an electron injection layer for injecting the electrons. The light emitting element LD may emit light, based on an electrical signal provided from the first electrode ELT1 and the second electrode layer ELT2.

The pixel defining layer PDL may define a position at which the light emitting element LD implemented as the organic light emitting diode is arranged. The pixel defining layer PDL may include or may be formed of an organic material. In an example, the pixel defining layer PDL may include or may be formed of at least one of acryl resin, epoxy resin, phenolic resin, polyamide resin, and polyimide resin, but the present disclosure is not limited thereto.

The thin film encapsulation TFE may be disposed on the second electrode ELT2. The thin film encapsulation TFE may cancel a step difference generated by the light emitting element LD and the pixel defining layer PDL. The thin film encapsulation TFE may include a plurality of insulating layers covering the light emitting element LD. In an example, the thin film encapsulation TFE may have a structure in which an inorganic layer and an organic layer are alternately stacked.

Hereinafter, a sensor unit TSP in accordance with an embodiment of the present disclosure will be described with reference to FIGS. 5 to 25. Descriptions of portions described above will be simplified or omitted.

Figure 5:
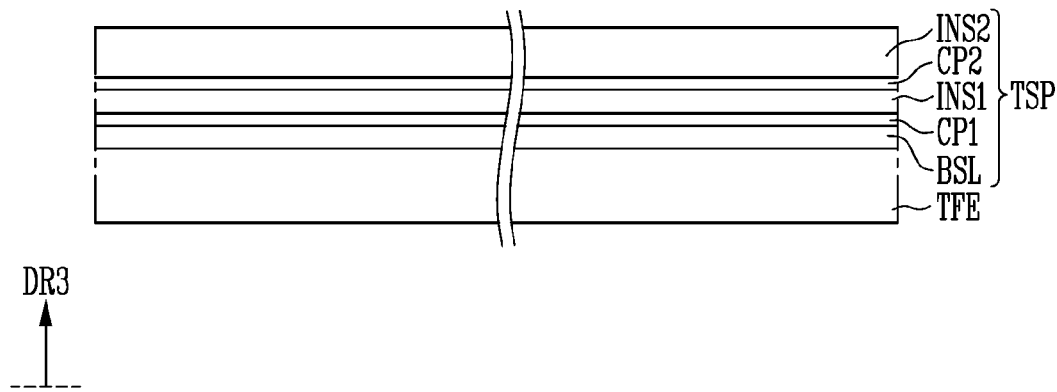

FIG. 5 is a sectional view schematically illustrating a sensor unit in accordance with an embodiment of the present disclosure.

Referring to FIG. 5, the sensor unit TSP may be disposed on the thin film encapsulation TFE of the display unit DP. The sensor unit TSP may include a base layer BSL, a first conductive pattern CP1, a first insulating layer INS1, a second conductive pattern CP2, and a second insulating layer INS2.

In accordance with an embodiment, the first conductive pattern CP1 and the second conductive pattern CP2 may be patterned at predetermined positions, to form sensors SC. For example, a portion of each of the first conductive pattern CP1 and the second conductive pattern CP2 may constitute a first sensor TX, and a portion of the second conductive pattern CP2 may constitute a second sensor RX.

The base layer BSL may be disposed on the thin film encapsulation TFE. The base layer BSL may provide an area in which the first conductive pattern CP1, the first insulating layer INS1, the second conductive pattern CP2, and the second insulating layer INS2 are disposed. In some embodiments, the base layer BSL may be omitted. The first conductive pattern CP1 may be disposed on the thin film encapsulation TFE.

The first conductive pattern CP1 may be disposed on the base layer BSL. The second conductive pattern CP2 may be disposed on the first insulating layer INS1. Each of the first conductive pattern CP1 and the second conductive pattern CP2 may be a single metal layer or may be a multi-layered metal layer. The first conductive pattern CP1 and the second conductive pattern CP2 may include or may be formed of at least one of various metal materials including gold (Au), silver (Ag), aluminum (Al), molybdenum (Mo), chromium (Cr), titanium (Ti), nickel (Ni), neodymium (Nd), copper (Cu), platinum (Pt), or an alloy thereof. In some embodiments, the first conductive pattern CP1 and the second conductive pattern CP2 may include or may be formed of at least one of various transparent conductive materials including one of silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, and graphene.

The first insulating layer INS1 may be disposed on the first conductive pattern CP1. The first insulating layer INS1 may be interposed between the first conductive pattern CP1 and the second conductive pattern CP2. The second insulating layer INS2 may be disposed on the second conductive pattern CP2.

Each of the first insulating layer INS1 and the second insulating layer INS2 may include or may be formed of an inorganic material or an organic material. In an example, the inorganic material may include silicon nitride ($SiN_x$), silicon oxide ($SiO_x$), silicon oxynitride ($SiO_xN_y$), or aluminum oxide ($AlO_x$). The organic material may include at least one of acryl-based resin, methacryl-based resin, polyisoprene, vinyl-based resin, epoxy-based resin, urethane-based resin, cellulose-based resin, siloxane-based resin, polyimide-based resin, polyamide-based resin, and perylene-based resin.

Hereinafter, a sensor unit TSP included in the display device DD in accordance with a first embodiment of the present disclosure will be described with reference to FIGS. 6 to 22.

Figure 6:
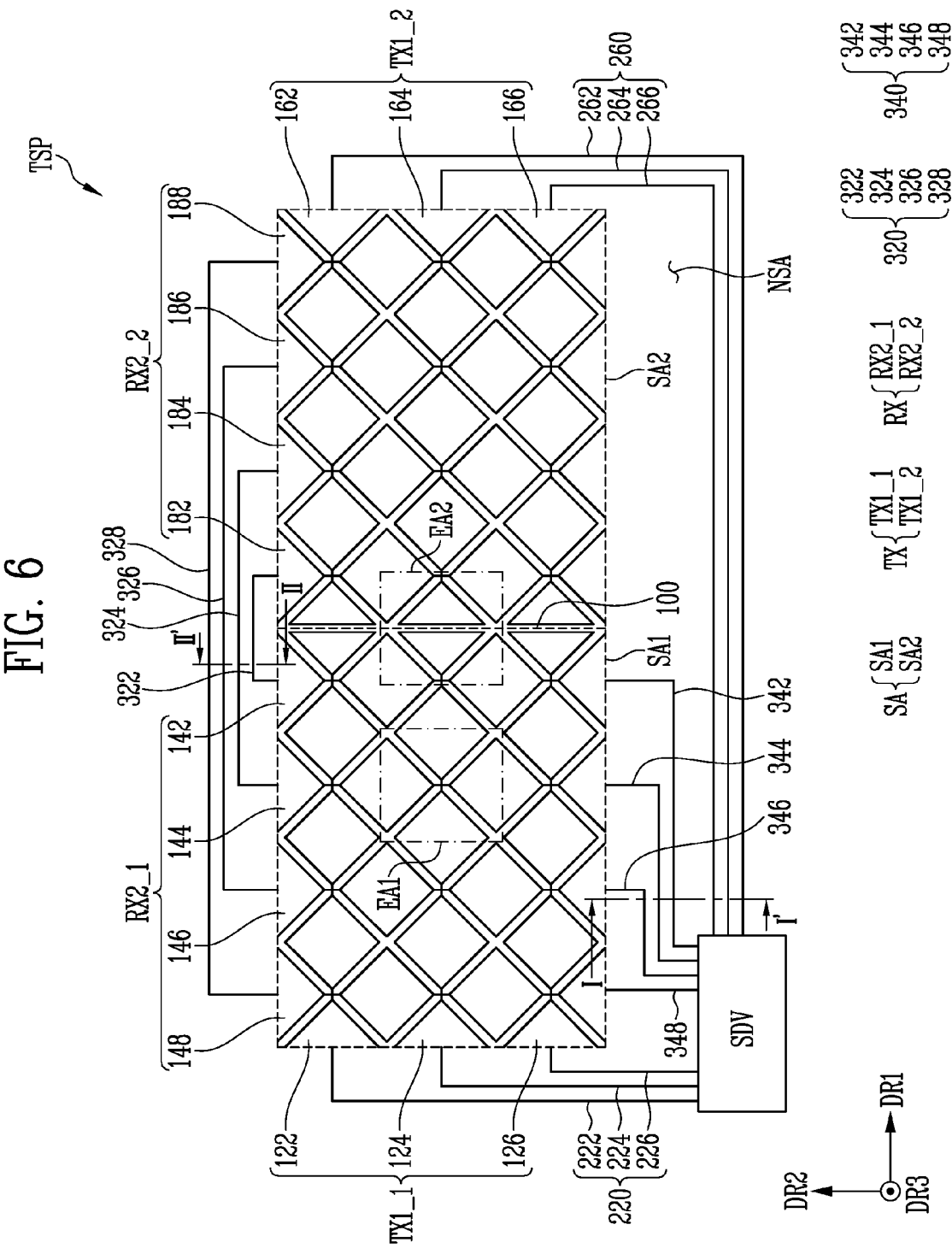

FIG. 6 is a plan view schematically illustrating a sensor unit in accordance with a first embodiment of the present disclosure. FIG. 6 is a view illustrating first sensors TX and second sensors RX in accordance with an embodiment of the present disclosure.

Referring to FIG. 6, a first sensing area SA1 and a second sensing area SA2 may be spaced apart from each other in the first direction DR1. The first sensing area SA1 and the second sensing area SA2 may be separated (or distinguished) from each other by a division line 100. The division line 100 may extend in a direction (e.g., the second direction DR2) different from that in which the first sensing area SA1 and the second sensing area SA2 are spaced apart from each other. The division line 100 may be referred to as a division region that extends along a straight line extending in the second direction DR2. For the brevity of description, the division line 100 indicates a gap between the first sensing area SA1 and the second sensing area SA2 which are physically separated from each other. In some embodiments, no direct connection between the (1_1)th sensors TX1_1 and (1_2)th sensors TX1_2 is formed over the division line 100 (i.e., the division region). The (1_1)th sensors TX1_1 and (1_2)th sensors TX1_2 will be described later.

A non-sensing area NSA may surround each of at least a portion of the first sensing area SA1 and at least a portion of the second sensing area SA2.

The first sensors TX and the second sensors RX may be disposed in a sensing area SA. For example, some of the first sensors TX may be disposed in the first sensing area SA1, and other some of the first sensors TX may be disposed in the second sensing area SA2. Some of the second sensors RX may be disposed in the first sensing area SA1, and other some of the second sensors RX may be disposed in the second sensing area SA2.

In accordance with an embodiment, the first sensors TX may include (1_1)th sensors TX1_1 and (1_2)th sensors TX1_2.

The (1_1)th sensors TX1_1 may be disposed in the first sensing area SA1. The (1_1)th sensors TX1_1 may correspond to a transmitting channel electrode for providing information on a touch input in the first sensing area SAL The (1_1)th sensors TX1_1 may be provided in plurality. The (1_1)th sensors TX1_1 may extend in the first direction DR1, and may be spaced apart from each other in the second direction DR2. The (1_1)th sensors TX1_1 may extend in the direction in which the first sensing area SA1 and the second sensing area SA2 are spaced part from each other.

In accordance with an embodiment, the (1_1)th sensors TX1_1 may include a (1_1)th sensor line 122, a (1_2)th sensor line 124, and a (1_3)th sensor line 126. For the brevity of description, the (1_1)th sensors TX1_1 are shown to have three sensor lines. The present invention, however, is not limited thereto. In some embodiments, the (1_1)th sensors TX1_1 may include four or more sensor lines.

The (1_1)th sensor line 122 of the (1_1)th sensors TX1_1 may be disposed along a first row of the sensing area SA. The (1_2)th sensor line 124 of the (1_1)th sensors TX1_1 may be disposed along a second row of the sensing area SA. The (1_3)th sensor line 126 of the (1_1)th sensors TX1_1 may be disposed along a third row of the sensing area SA. Each of the first row, the second row, and the third row may be a row line extending along the first direction DR1. In some embodiments, in each of the first to third rows in the first sensing area SA1 may include a plurality of sensor electrodes that are arranged in a straight line extending along the first direction DR1, and each two adjacent sensor electrodes are connected with each other to form a sensor line such as the (1_1)th sensor line 122, the (1_2)th sensor line 124, and the (1_3)th sensor line 126.

The (1_2)th sensors TX1_2 may be disposed in the second sensing area SA2. The (1_2)th sensors TX1_2 may correspond to a transmitting channel electrode for providing information on a touch input in the second sensing area SA2.

The (1_2)th sensors TX1_2 may be provided in plurality. The (1_2)th sensors TX1_2 may extend in the first direction DR1, and may be spaced apart from each other in the second direction DR2. The (1_2)th sensors TX1_2 may extend in the direction in which the first sensing area SA1 and the second sensing area SA2 are spaced apart from each other.

In accordance with an embodiment, the (1_2)th sensors TX1_2 may include a (1_1)th sensor line 162, a (1_2)th sensor line 164, and a (1_3)th sensor line 166. For the brevity of description, the (1_2)th sensors TX1_2 are shown to have three sensor lines. The present invention, however, is not limited thereto. In some embodiments, the (1_2)th sensors TX1_2 may include four or more sensor lines. In some embodiments, the number of the (1_2)th sensors TX1_2 may be the same as the number of the (1_1)th sensors TX1_1. Each sensor line may be a corresponding sensor among the (1_1)th and (1_2)th sensors. The sensor lines may be referred to as row sensor electrodes.

The (1_1)th sensor line 162 of the (1_2)th sensors TX1_2 may be disposed along a first row of the sensing area SA. The (1_2)th sensor line 164 of the (1_2)th sensors TX1_2 may be disposed along a second row of the sensing area SA. The (1_3)th sensor line 166 of the (1_2)th sensors TX1_2 may be disposed along a third row of the sensing area SA. Each of the first row, the second row, and the third row may be a row line extending along the first direction DR1. In some embodiments, each of the first to third rows in the second sensing area SA2 may include a plurality of sensor electrodes that are arranged along a straight line extending in the first direction DR1, and each two adjacent sensor electrodes are connected with each other to form a sensor line such as the (1_1)th sensor line 162, the (1_2)th sensor line 164, and the (1_3)th sensor line 166.

In accordance with an embodiment, a portion (e.g., an end) of the (1_1)th sensor line 122 of the (1_1)th sensors TX1_1 and a portion (e.g., an end) of the (1_1)th sensor line 162 of the (1_2)th sensors TX1_2 may be adjacent to each other with the division line 100 interposed therebetween. For example, the (1_1)th sensor line 122 of the (1_1)th sensors TX1_1 and the (1_1)th sensor line 162 of the (1_2)th sensors TX1_2 may be provided (or arranged) on the same first row.

In accordance with an embodiment, a portion (e.g., an end) of the (1_2)th sensor line 124 of the (1_1)th sensors TX1_1 and a portion (e.g., an end) of the (1_2)th sensor line 164 of the (1_2)th sensors TX1_2 may be adjacent to each other with the division line 100 interposed therebetween. For example, the (1_2)th sensor line 124 of the (1_1)th sensors TX1_1 and the (1_2)th sensor line 164 of the (1_2)th sensors TX1_2 may be provided (or arranged) on the same second row.

In accordance with an embodiment, a portion (e.g., an end) of the (1_3)th sensor line 126 of the (1_1)th sensors TX1_1 and a portion (e.g., an end) of the (1_3)th sensor line 166 of the (1_2)th sensors TX1_2 may be adjacent to each other with the division line 100 interposed therebetween. For example, the (1_3)th sensor line 126 of the (1_1)th sensors TX1_1 and the (1_3)th sensor line 166 of the (1_2)th sensors TX1_2 may be provided (or arranged) on the same third row.

In accordance with an embodiment, the second sensors RX may include (2_1)th sensors RX2_1 and (2_2)th sensors RX2_2.

The (2_1)th sensors RX2_1 may be disposed in the first sensing area SA1. The (2_1)th sensors RX2_1 may correspond to a receiving channel electrode for providing information on a touch input in the first sensing area SA1.

The (2_1)th sensors RX2_1 may be provided in plurality. The (2_1)th sensors RX2_1 may extend in the second direction DR2, and may be spaced apart from the first direction DR1.

In accordance with an embodiment, the (2_1)th sensors RX2_1 may include a (2_1)th sensor line 142, a (2_2)th sensor line 144, a (2_3)th sensor line 146, and a (2_4)th sensor line 148.

The (2_1)th sensor line 142 of the (2_1)th sensors RX2_1 may be disposed along a first column of the first sensing area SA1. The (2_1)th sensor line 142 may include a plurality of sensor electrodes arranged in the first column of the first sensing area SA1, and two adjacent sensor electrodes in the first column are connected with each other. The (2_2)th sensor line 144 of the (2_1)th sensors RX2_1 may be disposed along a second column of the first sensing area SA1. The (2_2)th sensor line 144 may include a plurality of sensor electrodes arranged in the second column of the first sensing area SA1, and two adjacent sensor electrodes in the second column are connected with each other. The (2_3)th sensor line 146 of the (2_1)th sensors RX2_1 may be disposed along a third column of the first sensing area SA1. The (2_3)th sensor line 146 may include a plurality of sensor electrodes arranged in the third column of the first sensing area SA1, and two adjacent sensor electrodes in the third column are connected with each other. The (2_4)th sensor line 148 of the (2_1)th sensors RX2_1 may be disposed along a fourth column of the first sensing area SA1. The (2_4)th sensor line 148 may include a plurality of sensor electrodes arranged in the fourth column, and two adjacent sensor electrodes in the fourth column are connected with each other. Each of the first column, the second column, the third column, and the fourth column may be a column line extending along the second direction DR2. The first column, the second column, the third column, and the fourth column may be sequentially arranged along the first direction DR1 in the first sensing area SA1 from the division line 100. For the sake of brevity, each of the (2_1)th sensors RX2_1 and the (2_2)th sensors RX2_2 includes four columns. The present invention, however, is not limited thereto. In some embodiments, each of the (2_1)th sensors RX2_1 and the (2_2)th sensors RX2_2 may include four or more columns. In some embodiments, the number of (2_1)th sensors RX2_1 in the first sensing area SA1 may be the same as the number of the (2_2)th sensors RX2_2 in the second sensing area SA2.

The (2_2)th sensors RX2_2 may be disposed in the second sensing area SA2. The (2_2)th sensors RX2_2 may correspond to a receiving channel electrode for providing information on a touch input in the second sensing area SA2.

The (2_2)th sensors RX2_2 may be provided in plurality. The (2_2)th sensors RX2_2 may extend in the second direction DR2, and may be spaced apart from each other in the first direction DR1.

In accordance with an embodiment, the (2_2)th sensors RX2_2 may include (2_1)th sensor line 182, a (2_2)th sensor line 184, a (2_3)th sensor line 186, and a (2_4)th sensor line 188.

The (2_1)th sensor line 182 of the (2_2)th sensors RX2_2 may be disposed along a first column of the second sensing area SA2. The (2_1)th sensor line 182 may include a plurality of sensor electrodes arranged in the first column of the second sensing area SA2, and two adjacent sensor electrodes in the first column are connected with each other. The (2_2)th sensor line 184 of the (2_2)th sensors RX2_2 may be disposed along a second column of the second sensing area SA2. The (2_2)th sensor line 184 may include a plurality of sensor electrodes arranged in the second column of the second sensing area SA2, and two adjacent sensor electrodes in the second column are connected with each other. The (2_3)th sensor line 186 of the (2_2)th sensors RX2_2 may be disposed along a third column of the second sensing area SA2. The (2_3)th sensor line 186 may include a plurality of sensor electrodes arranged in the third column of the second sensing area SA2, and two adjacent sensor electrodes in the third column are connected with each other. The (2_4)th sensor line 188 of the (2_2)th sensors RX2_2 may be disposed along a fourth column of the second sensing area SA2. The (2_4)th sensor line 188 may include a plurality of sensor electrodes arranged in the fourth column of the second sensing area SA2, and two adjacent sensor electrodes in the fourth column are connected with each other. Each of the first column, the second column, the third column, and the fourth column may be a column line extending along the second direction DR2. The first column, the second column, the third column, and the fourth column may be sequentially arranged along the first direction DR1 in the second sensing area SA2 from the division line 100.

The sensor unit TSP may include a connection pattern 320. The connection pattern 320 may be disposed in the non-sensing area NSA. The connection pattern 320 may be disposed at one side of the sensing area SA. The connection pattern 320 may disposed at one side at which a sensor driver SDV is not disposed. For example, the sensor driver SDV may be disposed at a first side of the sensing area SA, and the connection pattern 320 may be disposed at a second side of the sensing area SA. In some embodiment, the first side of the sensing area SA may be opposite to the second side of the sensing area SA.

In accordance with this embodiment, a single sensor driver SDV may be disposed at a predetermined position. In some embodiments, the single sensor driver SDV may be shared by the first sensing area SA1 and the second sensing area SA2. Accordingly, the single sensor driver SDV may reduce manufacturing costs compared to using a plurality of sensor drivers.

The connection pattern 320 may be provided in the same layer as the first conductive pattern CP1 and/or the second conductive pattern CP2. At least a portion of the connection pattern 320 may extend in the first direction DR1, and at least another portion of the connection pattern 320 may extend in the second direction DR2. The connection pattern 320 may be bent at least twice. In accordance with an embodiment, the connection pattern 320 may at least overlap an extension line of the division line 100.

In accordance with an embodiment, the (2_1)th sensors RX2_1 and the (2_2)th sensors RX2_2 may be electrically connected by the connection pattern 320. For example, one end of the connection pattern 320 may be electrically connected to the (2_1)th sensors RX2_1, and the other end of the connection pattern 320 may be electrically connected to the (2_2)th sensors RX2_2.

The connection pattern 320 may include a first connection pattern 322, a second connection pattern 324, a third connection pattern 326, and a fourth connection pattern 328.

For example, the first connection pattern 322 may electrically connect the (2_1)th sensor line 142 of the (2_1)th sensors RX2_1 to the (2_1)th sensor line 182 of the (2_2)th sensors RX2_2. In some embodiments, the first connection pattern 322 may include a first portion extending along a straight line extending in the first direction DR1, a second portion extending from a first end of the first portion to be connected to the (2_1)th sensor line 142 and extending along a straight line extending in the second direction DR2, a third portion extending from a second end of the first portion to be connected to (2_1)th sensor line 182 and extending along a straight line extending in the second direction DR2.

The second connection pattern 324 may electrically connect the (2_2)th sensor line 144 of the (2_1)th sensors RX2_1 to the (2_2)th sensor line 184 of the (2_2)th sensors RX2_2. In some embodiments, the second connection pattern 324 may include a first portion extending along a straight line extending in the first direction DR1, a second portion extending from a first end of the first portion to be connected to the (2_2)th sensor line 144 and extending along a straight line extending in the second direction DR2, a third portion extending from a second end of the first portion to be connected to (2_2)th sensor line 184 and extending along a straight line extending in the second direction DR2.

The third connection pattern 326 may electrically connect the (2_3)th sensor line 146 of the (2_1)th sensors RX2_1 to the (2_3)th sensor line 186 of the (2_2)th sensors RX2_2. In some embodiments, the third connection pattern 326 may include a first portion extending along a straight line extending in the first direction DR1, a second portion extending from a first end of the first portion to be connected to the (2_3)th sensor line 146 and extending along a straight line extending in the second direction DR2, a third portion extending from a second end of the first portion to be connected to (2_3)th sensor line 186 and extending along a straight line extending in the second direction DR2.

The fourth connection pattern 328 may electrically connect the (2_4)th sensor line 148 of the (2_1)th sensors RX2_1 to the (2_4)th sensor line 188 of the (2_2)th sensors RX2_2. In some embodiments, the fourth connection pattern 328 may include a first portion extending along a straight line extending in the first direction DR1, a second portion extending from a first end of the first portion to be connected to the (2_4)th sensor line 148 and extending in the second direction DR2, a third portion extending from a second end of the first portion to be connected to (2_4)th sensor line 188 and extending along a straight line extending in the second direction DR2.

The connection pattern 320 may electrically connect a sensor line disposed on an nth column of the first sensing area SA1 to a sensor line disposed on an nth column of the second sensing area SA2. Accordingly, the connection patterns 320 can electrically connect sensor lines with each other without vertically overlapping each other. For example, the first connection pattern 322 may electrically connect sensor lines at a first distance from the division line 100, and the second connection pattern 324 may electrically connect sensor lines at a second distance from the division line 100. The first distance between the sensor lines 142 and 182 electrically connected by the first connection pattern 322 may be smaller than the second distance between the sensor lines 144 and 184 electrically connected by the second connection pattern 324.

Accordingly, the connection pattern 320 may electrically connect sensor lines of the (2_1)th sensors RX2_1 to sensor lines of the (2_2) sensors RX2_2.

Lines directly connecting the (2_2)th sensors RX2_2 and the sensor driver SDV with each other may be omitted. For example, electrical information acquired by the (2_1)th sensor line 182 of the (2_2)th sensors RX2_2 in the second sensing area SA2 may be provided to the sensor driver SDV via the first connection pattern 322 and the (2_1)th sensor line 142 of the (1_1)th sensors RX_1. Thus, in accordance with the present disclosure, a line density can be decreased, and a space in which the other lines are to be disposed can be sufficiently secured.

The sensor driver SDV may be disposed in the non-sensing area NSA. The sensor driver SDV may be electrically connected to electrodes in the sensing area SA through a plurality of lines.

The sensor driver SDV may be electrically connected to the (1_1)th sensors TX1_1 through a first line 220. The first line 220 may be bent at least once when viewed in a plan view. At least a portion of the first line 220 may extend in the second direction DR2. In accordance with an embodiment, the first line 220 may be disposed in the same layer as the first conductive pattern CP1 and/or the second conductive pattern CP2.

The first line 220 may include a (1_1)th line 222, a (1_2)th line 224, and a (1_3)th line 226. The sensor driver SDV may be electrically connected to the (1_1)th sensor line 122 of the (1_1)th sensors TX1_1 through the (1_1)th line 222. The sensor driver SDV may be electrically connected to the (1_2)th sensor line 124 of the (1_1)th sensors TX1_1 through the (1_2)th line 224. The sensor driver SDV may be electrically connected to the (1_3)th sensor line 126 of the (1_1)th sensors TX1_1 through the (1_3)th line 226.

The sensor driver SDV may be connected to the (1_2)th sensors TX1_2 through a second line 260. The second line 260 may be bent at least once when viewed in a plan view. At least a portion of the second line 260 may extend in the second direction DR2. In accordance with an embodiment, the second line 260 may be disposed in the same layer as the first conductive pattern CP1 and/or the second conductive pattern CP2.

The second line 260 may include a (2_1)th line 262, a (2_2)th line 264, and a (2_3)th line 266. The sensor driver SDV may be electrically connected to the (1_1)th sensor line 162 of the (1_2)th sensors TX1_2 through the (2_1)th line 262. The sensor driver SDV may be electrically connected to the (1_2)th sensor line 164 of the (1_2)th sensors TX1_2 through the (2_2)th line 264. The sensor driver SDV may be electrically connected to the (1_3)th sensor line 166 of the (1_2)th sensors TX1_2 through the (2_3)th line 266.

The sensor driver SDV may be electrically connected to the (2_1)th sensors RX2_1 through a third line 340. The third line may be bent at least once when viewed in a plan view. At least a portion of the third line 340 may extend in the second direction DR2. In accordance with an embodiment, the third line 340 may be disposed in the same layer as the first conductive pattern CP1 and/or the second conductive pattern CP2.

The third line 340 may include a (3_1)th line 342, a (3_2)th line 344, a (3_3)th line 346, and a (3_4)th line 348. The sensor driver SDV may be electrically connected to the (2_1)th sensor line 142 of the (2_1)th sensors RX2_1 through the (3_1)th line 342. The sensor driver SDV may be electrically connected to the (2_2)th sensor line 144 of the (2_1)th sensors RX2_1 through the (3_2)th line 344. The sensor driver SDV may be electrically connected to the (2_3)th sensor line 146 of the (2_1)th sensors RX2_1 through the (3_3)th line 346. The sensor driver SDV may be electrically connected to the (2_4)th sensor line 148 of the (2_1)th sensors RX2_1 through the (3_4)th line 348.

Figure 7:
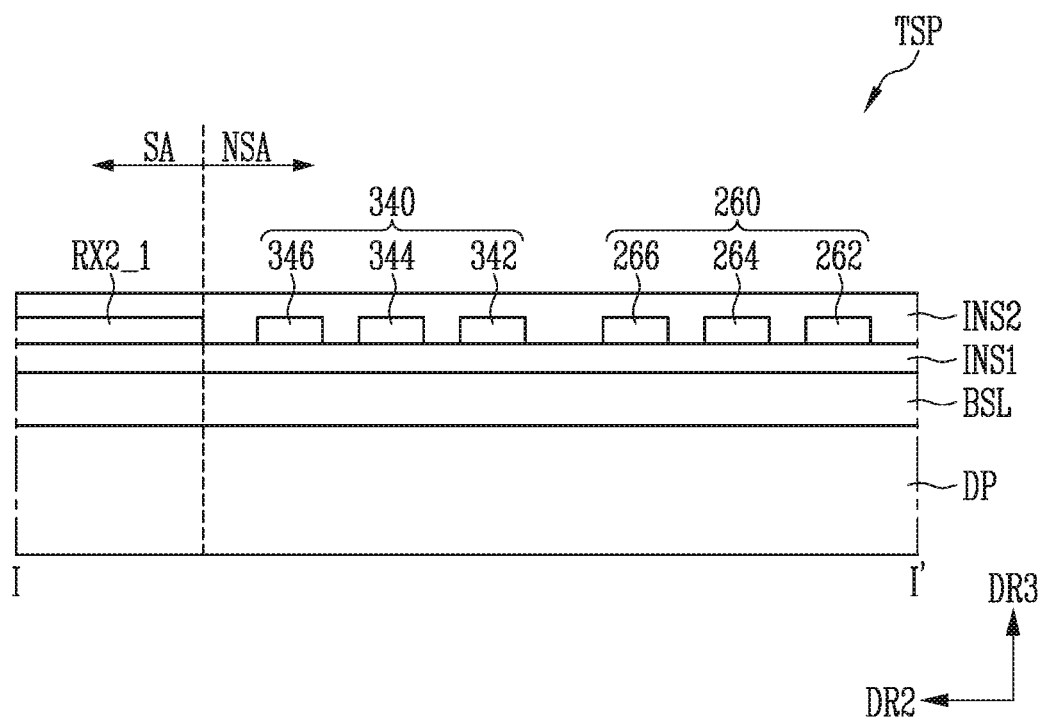
Figure 8:
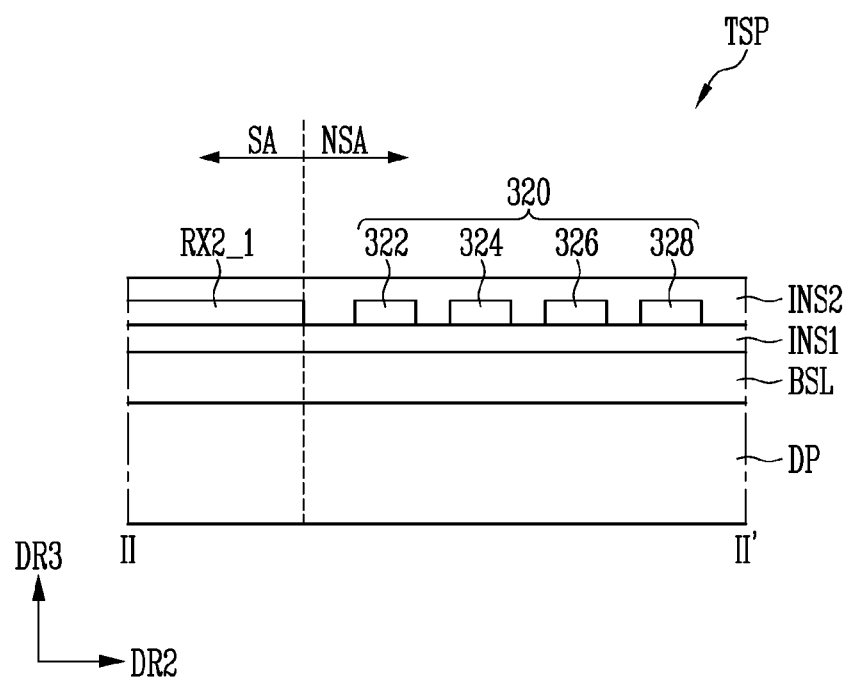

FIGS. 7 and 8 may be views illustrating a structure of the non-sensing area NSA adjacent to the sensing area SA. FIG. 7 is a schematic sectional view taken along line I-I' shown in FIG. 6. FIG. 8 is a schematic sectional view taken along line II-II' shown in FIG. 6.

Referring to FIG. 7, the base layer BSL may be disposed on the display unit DP, the first insulating layer INS1 may be disposed on the base layer BSL, and the second line 260, the third line 340, and the (2_1)th sensors RX2_1 may be disposed on the first insulating layer INS1. The second insulating layer INS2 may be disposed over the second line 260, the third line 340, and the (2_1)th sensors RX2_1.

In accordance with an embodiment, the (2_1)th sensors RX2_1 may be disposed in the sensing area SA, and the second line 260 and the third line 340 may be disposed in the non-sensing area NSA. In accordance with this embodiment, the second line 260 and the third line 340 may be disposed in the same layer as the second conductive pattern CP2.

In accordance with an embodiment, the (3_1)th line 342, the (3_2)th line 344, and the (3_3)th line 346 may be spaced apart from each other in the second direction DR2. The (2_1)th line 262, the (2_2)th line 264, and the (2_3) line 266 may be spaced apart from each other in the second direction DR2.

Referring to FIG. 8, the base layer BSL may be disposed on the display unit DP, the first insulating layer INS1 may be disposed on the base layer BSL, and the connection pattern 320 and the (2_1)th sensors RX2_1 may be disposed on the first insulating layer INS1. The second insulating layer INS2 may be disposed over the connection pattern 320 and the (2_1)th sensors RX2_1.

In accordance with an embodiment, the connection pattern 320 may be disposed in the non-sensing area NSA. In accordance with this embodiment, the connection pattern 320 may be disposed in the same layer as the second conductive pattern CP2.

In accordance with an embodiment, the first connection pattern 322, the second connection pattern 324, the third connection pattern 326, and the fourth connection pattern 328 may be spaced apart from each other in the second direction DR2.

Experimentally, when a density of lines disposed in a partial area of the non-sensing area NSA disposed at one side of the sensing area SA and a density of lines disposed in another partial region of the non-sensing area NSA disposed at the other side of the sensing area SA are excessively different from each other, external visibility may be damaged. In order to prevent the damaged visibility, a plan has been known, in which a dummy line which does not perform any line function is disposed in a specific area, thereby relatively uniformly maintaining the density of lines disposed in each area of the non-sensing area NSA. However, to place the dummy line on a display panel, an additional outer space may be necessary.

However, in accordance with an embodiment, while lines are disposed in a portion of the non-sensing area disposed at one side of the sensing area SA (e.g., FIG. 7), the connection pattern 320 electrically connecting the (2_1)th sensors RX2_1 and the (2_2)th sensors RX2_2, instead of the dummy line, is disposed in a portion of the non-sensing area NSA disposed at the other side of the sensing area SA, so that outer spaces can be efficiently used. Accordingly, lines are uniformly distributed to secure external visibility, so that the non-sensing area NSA can be efficiently used.

Any line used to directly connect the (2_2)th sensors RX2_2 to the sensor driver SDV may be omitted, and thus the deterioration of touch sensitivity due to a data load can be prevented.

Next, a detailed structure of the first sensors TX and the second sensors RX in accordance with an embodiment of the present disclosure will be described with reference to FIGS. 9 to 11.

Figure 9:
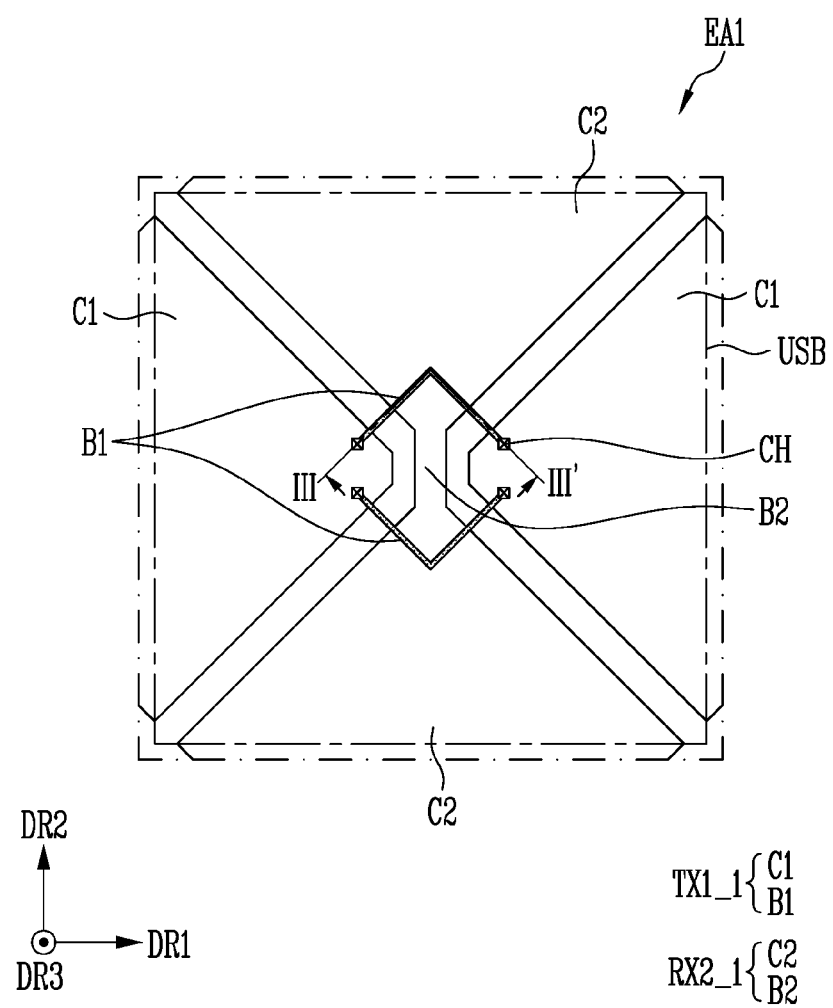

FIG. 9 is an enlarged view of area EA1 shown in FIG. 6. FIG. 10 is a schematic sectional view taken along line III-III' shown in FIG. 9. FIGS. 9 and 10 are views schematically illustrating individual components of the first sensing area SA. Features of the first sensing area SA1 described with reference to FIGS. 9 and 10 may be similarly applied to the second sensing area SA2.

Figure 10:
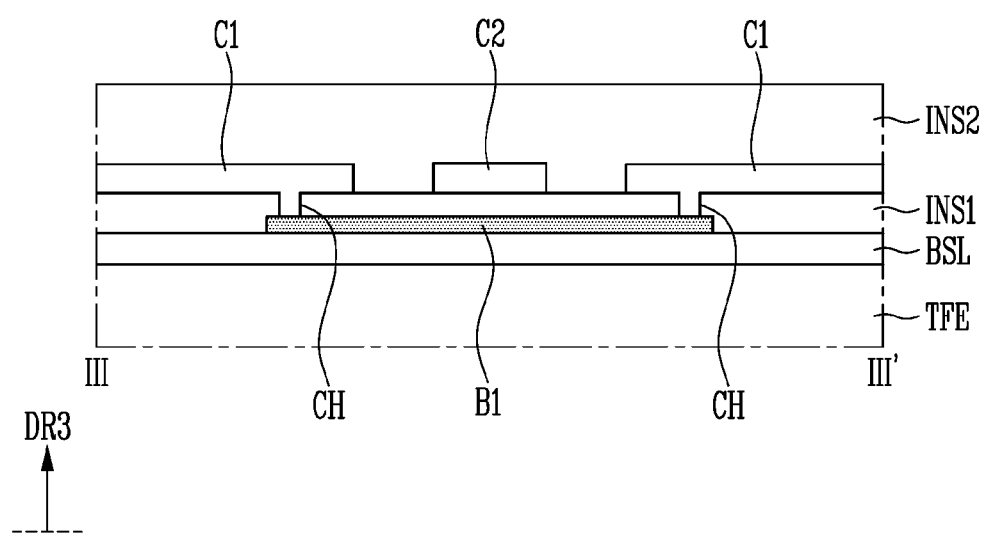

Referring to FIGS. 9 and 10, the (1_1)th sensors TX1_1 may include first cells C1 and first bridges B1. The first bridges B1 may electrically connect adjacent first cells C1 with each other. In some embodiments, the first bridges B1 may be integrally formed with the first cells C1. The first cells C1 may be included in the second conductive pattern CP2, and the first bridges B1 may be included in the first conductive pattern CP1.

The (2_1)th sensors RX2_1 may include second cells C2 and second bridges B2. The second bridges B2 may electrically connect adjacent second cells with each other. The second bridges B2 may be integrally formed with the second cells. In some embodiments, the second bridges B2 and the second cells C2 may be formed in layers separate from each other, to be electrically connected with each other through the other contact hole. The second cells C2 and the second bridges B2 may be included in the second conductive pattern CP2.

The sensor unit TSP may have a form in which a unit sensor block USB is repeatedly arranged. The unit sensor block USB may refer to a virtual unit block having a predetermined area, which includes at least a portion of adjacent (1_1)th sensors TX1_1 and at least a portion of adjacent (2_1)th sensors RX2_1. The unit sensor block USB may correspond to a minimum repetition unit of an arrangement pattern of the (1_1)th sensors TX1_1 and the (2_1)th sensors TX2_1.

In accordance with an embodiment, the first bridge patterns B1 may be disposed on the base layer BSL. The first bridges B1 may be provided in the same layer as the first conductive pattern CP1. The first bridges B1 may be electrically connected to the first cells C1 through contact holes CH.

In the above-described embodiment, although a case where the first bridges B1 are included in the first conductive pattern CP1, and the first cells C1, the second cells C2, and the second bridges B2 are included in the second conductive pattern CP2 has been described as an example, the present disclosure is not limited thereto. In some embodiments, the first cells C1, the second cells C2, and the second bridges B2 may be included in the first conductive pattern CP1, and the first bridges B1 may be included in the second conductive pattern CP2.

Figure 11:
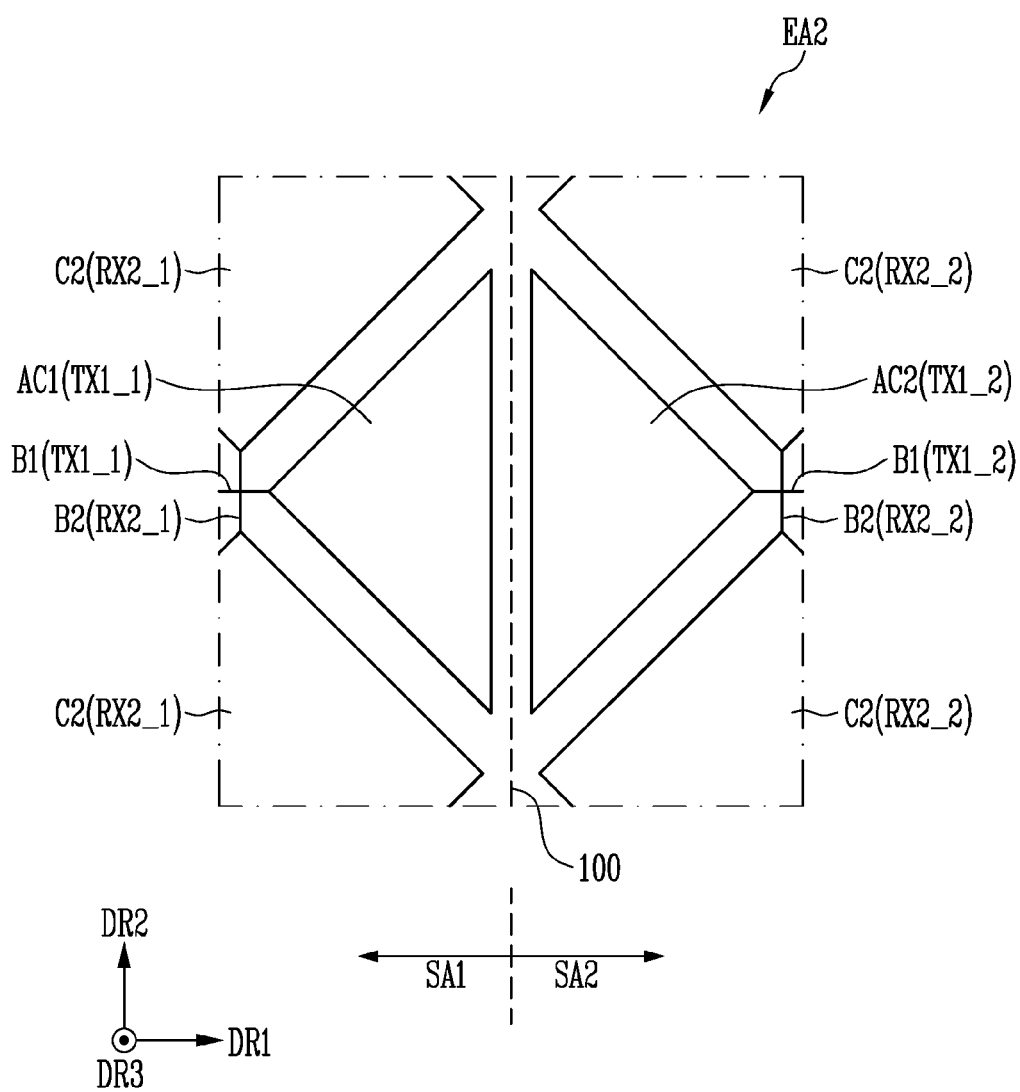

FIG. 11 is an enlarged view of area EA2 shown in FIG. 6. FIG. 11 may be a view illustrating an area in which the first sensing area SA1 and the second sensing area SA2 are adjacent to each other.

Referring to FIG. 11, the first sensing area SA1 and the second sensing area SA2 may be disposed adjacent to each other with respect to the division line 100. The (1_1)th sensors TX1_1 and (2_1)th sensors RX2_1 may be disposed at a first side of the division line 100 (e.g., in the first sensing area SA1). The (1_2)th sensors TX1_2 and (2_2)th sensors RX2_2 may be disposed at a second side, opposite to the first side, of the division line 100 (e.g., in the second sensing area SA2).

The (1_1)th sensors TX1_1 may include a first adjacent cell AC1. The first adjacent cell AC1 may be a cell arranged along a row line of the first sensing area SA1 (e.g., the first direction DR1), similarly to first cells C1 of the (1_1)th sensor cells C1. For example, the first adjacent cell AC1 may be electrically connected to adjacent first cells C1 through first bridges B1. For example, each of the (1_1)th sensors TX1_1 may include a plurality of first cells having a first shape and a second cell having a second shape. In each (1_1)th sensor, two adjacent first cells may be connected with each other using a respective first bridge, and the second cell may be adjacent to the division line 100 (see, FIG. 6). The second cell may be connected to a cell that is closest to the division line 100, among the plurality of first cells. The second cell and the cell, closest to the division line 100, may be connected with each other using a corresponding first bridge. In each (1_1)th sensor, the plurality of first cells and the second cell may be arranged along a straight line extending in the first direction DR1.

The first adjacent cell AC1 may be included in the first conductive pattern CP1 and/or the second conductive pattern CP2, but is not limited to a specific example.

One side of the first adjacent cell AC1 may face the division line 100. One side of the first adjacent cell AC1 may face second cells C2 of the (2_1)th sensors RX2_1.

The first adjacent cell AC1 (i.e., the second cell) may have a shape different from that of the first cells C1 (i.e., the plurality of first cells) of the (1_1)th sensors TX1_1. An area of the first adjacent cell AC1 may be smaller than that of the first cells C1 of the (1_1)th sensors TX1_1.

The first adjacent cell AC1 may have a shape obtained by dividing the shape of the first cells C1 into two halves. For example, when the first cells C1 have a diamond shape, the first adjacent cell AC1 may have a triangular shape.

The (1_2)th sensors TX1_2 may include a second adjacent cell AC2. The second adjacent cell AC2 may be a cell arranged along a row line of the second sensing area SA2 (e.g., the first direction DR1), similarly to first cells C1 of the (1_2)th sensors TX1_2. For example, the second adjacent cell AC2 may be electrically connected to adjacent first cells C1 through first bridges B1 of the (1_2)th sensors TX1_2. For example, each of the (1_2)th sensors TX1_2 may include a plurality of third cells having the first shape and a fourth cell having a third shape. In each (1_2)th sensor, two adjacent third cells may be connected with each other using a first bridge, and the fourth cell may be adjacent to the division line 100 (see, FIG. 6). The fourth cell may be connected to a cell that is closest to the division line 100, among the plurality of third cells. The fourth cell and the cell, closest to the division line 100 among the plurality of third cells, may be connected with each other using a corresponding first bridge. In each (1_2)th sensor TX1_2, the plurality of third cells and the fourth cell may be arranged along a straight line extending in the first direction DR1. In some embodiments, the configuration of the (1_2)th sensors TX1_2 may be mirror-symmetric with the configuration of the (1_1)th sensors TX1_1. In some embodiments, the second cell in the first sensing area SA1 and the fourth cell in the second sensing area SA2 may be mirror-symmetric with each other with respect to the division line 100.

The second adjacent cell AC2 may be included in the first conductive pattern CP1 and/or the second conductive pattern CP2, but is not limited to a specific example.

One side of the second adjacent cell AC2 may face the division line 100. One side of the second adjacent cell AC2 may face second cells C2 of the (2_2)th sensors RX2_2.

The second adjacent cell AC2 may have a shape different from that of the first cells C1 of the (1_2)th sensors TX1_2. An area of the second adjacent cell AC2 may be smaller than that of the first cells of the (1_2)th sensors TX1_2.

The second adjacent cell AC2 may have a shape obtained by dividing the shape of the first cells C1 in half. For example, when the first cells C 1 have a diamond shape, the second adjacent cell AC2 may have a triangular shape.

The first adjacent cell AC1 and the second adjacent cell AC2 may not overlap each other when viewed in a plan view. The one side of the first adjacent cell AC1, which does not face the (2_1)th sensors RX2_1, may face the one side of the second adjacent cell AC2, which does not face the (2_2)th sensors RX2_2.

In accordance with an embodiment, the first adjacent cell AC1 and the second adjacent cell AC2 may be provided in a floating state, when sensing signals are provided to the first sensing area SA1 and/or the second sensing area SA2 to sense a touch input (or when a touch input to the first sensing area SA1 and/or the second sensing area SA2).

However, the present disclosure is not limited to the above-described example. In accordance with some embodiments, each of the first adjacent cell AC1 and the second adjacent cell AC2 may be electrically connected to a separate ground line. The first adjacent cell AC1 and the second adjacent cell AC2 may receive a ground signal, when sensing signals are provided to the first sensing area SA1 and/or the second sensing area SA2 to sense a touch input. For example, when a touch input to the first sensing area SA1 is sensed, the ground signal may be provided to the first adjacent cell AC1. When a touch input to the second sensing area SA2 is sensed, the ground signal may be provided to the second adjacent cell AC2.

In accordance with this embodiment, the deterioration of touch sensitivity can be minimized, even when an area of the first adjacent cell AC1 and the second adjacent cell AC2 is smaller than that of the first cells C1 of the (1_1)th sensors TX1_1 and the (1_2)th sensors TX1_2.

A structure of the display device DD associated with the first sensing area SA1 and the second sensing area SA2 will be described.

FIG. 12 is a plan view schematically illustrating a display device in accordance with an embodiment of the present disclosure. FIG. 13 is a perspective view schematically illustrating a display device in accordance with an embodiment of the present disclosure.

First, referring to FIG. 12, the display device DD may be folded with respect to the division line 100 for distinguishing the first sensing area SA1 and the second sensing area SA2 from each other. For example, when the display device DD is folded, the first sensing area SA1 and the second sensing area SA2 are disposed to face each other.

Next, referring to FIG. 13, the display device DD may be bent with respect to the division line 100 for distinguishing the first sensing area SA1 and the second sensing area SA2 from each other. For example, the display device DD may further include a bending area BA. The bending area BA may be an area having a curve with respect to a surface formed flat. In an example, the bending area BA may be formed at both sides of the display device DD. In accordance with an embodiment, the sensing area SA1 may be disposed in (or correspond to) a flat area of the display device DD, and the second sensing area SA2 may be disposed in (or correspond to) the bending area BA of the display device DD. Accordingly, a curve may occur along the bending area BA with respect to the division line 100 disposed between the first sensing area SA1 and the second sensing area SA2.

However, the present disclosure is not limited to the above-described example. For example, in the display device DD, a position relationship between the first sensing area SA1 and the second sensing area SA2 may be changed by a slide operation. In an example, when the display device DD has a first slide state, the first sensing area SA1 and the second sensing area SA2 may not overlap each other. When the display device DD has a second slide state in which the position of a portion of the display device DD is changed while being slid, the first sensing area SA1 and the second sensing area SA2 may overlap each other.

In some embodiments, the display device DD in accordance with the embodiment of the present disclosure may have an aspect ratio greater than 1. For example, in FIG. 12, a length of the display device DD along the first direction DR1 as a direction in which the first sensing area SA1 and the second sensing area SA2 are adjacent to each other may be greater than that of the display device DD along the second direction DR2. The number of first sensors TX extending along the first direction DR1 is decreased, and therefore, a resistance-capacitance delay may be reduced. However, the aspect ratio of the display device DD is not limited to a specific example.

Next, a sensing operation of the sensor unit TSP in accordance with an embodiment of the present disclosure will be described with reference to FIGS. 14 to 22.

FIG. 14 is a block diagram illustrating a sensor unit in accordance with an embodiment of the present disclosure.

Referring to FIG. 14, the sensor unit TSP may include an input sensing unit ISU and a sensor driver SDV for driving the input sensing unit ISU. The input sensing unit ISU may include (or cover) the first sensors TX and the second sensors RX, which are described above.

The sensor driver SDV may include a driving signal generator TXD, an analog front ends AFE, and a signal processor DSP.

The driving signal generator TXD may generate a driving signal TXS (or first sensing signal), and provide the driving signal TXS to the first sensors TX. The driving signal generator TXD may be electrically connected to the first sensors TX. The driving signal generator TXD may be implemented as an oscillator.

In accordance with an embodiment, the driving signal TXS may have an AC voltage of a sinusoidal wave including a sine wave and/or a cosine wave, or a square wave. In some embodiments, when the driving signal TXS has an AC voltage of a sine wave, driving signals TXS have sine waves similar to each other, even when a partial resistance-capacitance (RC) delay occurs, and accordingly, noise can be easily removed.

The analog front ends AFE may provide the signal processor DSP with a provided sensing value (e.g., a second sensing signal). The analog front ends AFE may be electrically connected to the second sensors RX. The analog front ends AFE may provide a sensing value of the second sensors RX. The analog front ends AFE may be provided in plurality, to be electrically connected to the respective second sensors RX.

In accordance with an embodiment, the analog front ends AFE may be implemented with a differential analog front end. For example, when the analog front end AFE includes an amplifier, a chopping circuit, filters, and an analog-digital converter, which are sequentially connected, the analog front end AFE may output two differential signals by differentially amplifying received signals, using the charge amplifier, demodulate and filter each of the two differential signals, using the chopping circuit and the filters, and provide the two filtered differential signals to the analog-digital converter. The analog-digital converter may output a sensing value, based on a difference between the two filtered differential signals.

The signal processor DSP may determine whether a touch has occurred based on sensing values, or may acquire information on a position at which the touch occurs. The signal processor DSP may be electrically connected to the analog front end. The signal processor DSP may be implemented in a hardware manner, including logic elements, or may be implemented in a software manner in an integrated circuit.

Hereinafter, the analog front end AFE in accordance with the embodiment of the present disclosure will be described in more detail. FIGS. 15 to 19 are diagrams illustrating an analog front end in accordance with an embodiment of the present disclosure.

Figure 15:
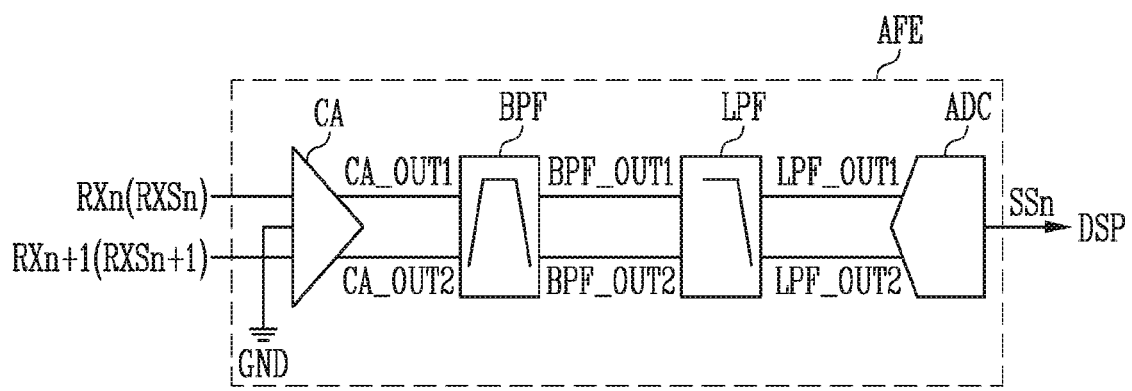
Figure 16:
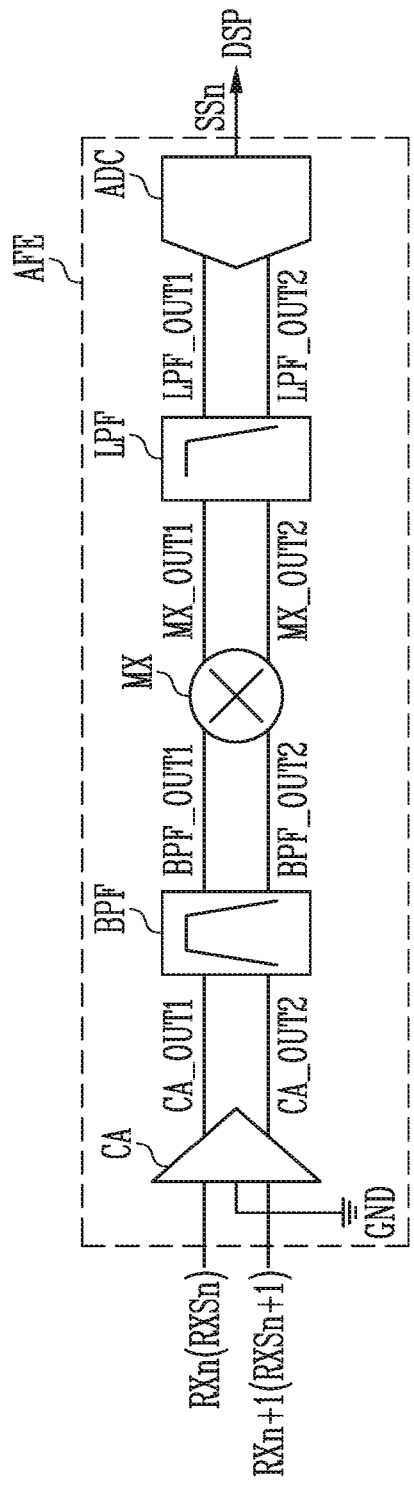

Referring to FIGS. 15 and 16, the analog front end AFE may include an amplifier CA, a band pass filter BPF, a low pass filter LPF, and an analog-digital converter ADC. In accordance with an embodiment, the analog front end AFE may further include a mixer MX.

The amplifier CA may receive an nth sensing signal RXSn provided from an nth sensor line RXn and an (n+1)th sensing signal RXSn+1 provided from an (n+1)th sensor line RXn+1 among the second sensors RX (e.g., the (2_1)th sensors RX2_1 or the (2_2)th sensors RX2_2), and output a complementary first differential signal CA_OUT1 (or first amplification signal) and a complementary second differential signal CA_OUT2 (or second amplification signal) by differentially amplifying the nth sensing signal RXSn and the (n+1)th sensing signal RXSn+1. The nth sensor line RXn and the (n+1)th sensor line RXn+1 may correspond to sensor lines of each of the above-described second sensors RX (e.g., as shown in FIG. 6). For example, when the nth sensor line RXn is the (2_1)th sensor line 182, the (n+1)th sensor line RXn+1 may be the (2_2)th sensor line 184.

In accordance with an embodiment, the amplifier CA may be implemented as a fully differential amplifier. A differential amplifier may be defined as an amplifier which outputs one signal generated based on a voltage difference between two input signals, and a fully differential amplifier may be defined as an amplifier which outputs two differential signals (i.e., complementary signals) based on a voltage difference between two input signals. The amplifier CA implemented as the fully differential amplifier can maximize magnitudes of sensing signals, in relation to the analog-digital converter ADC (e.g., a differential analog-digital converter which outputs a digital value by differentiating two analog signals). In some embodiments, for very small voltage difference between the nth sensing signal RXSn and the (n+1)th sensing signal RXSn+1, the analog-digital converter ADC may digitize the small voltage difference using the amplifier CA, the band pass filter BPF and the low pass filter LPF. In some embodiments, a reference voltage GND may be provided to the amplifier CA.

The band pass filter BPF may output a first filtered signal BPF_OUT1 and a second filtered signal BPF_OUT2 by selecting only a signal of a specific frequency band of each of the first differential signal CA_OUT1 and the second differential signal CA_OUT2.

The band pass filter BPF may output the first filtered signal BPF_OUT1 by selectively amplifying the first differential signal CA_OUT1, and output the second filtered signal BPF_OUT2 by selectively amplifying the second differential signal CA_OUT2. For example, the band pass filter BPF may output the first filtered signal BPF_OUT1 through a positive output terminal of the fully differential amplifier by selectively amplifying the first differential signal CA_OUT1 applied to a negative input terminal of the fully differential amplifier, and output the second filtered signal BPF_OUT2 through the negative output terminal of the fully differential amplifier by selectively amplifying the second differential signal CA_OUT2 applied to the positive input terminal of the fully differential amplifier. The second filtered signal BPF_OUT2 may have a waveform obtained by inverting the first filtered signal BPF_OUT1.

The mixer MX may output a first demodulation signal MX_OUT1 and a second demodulation signal MX_OUT2 by changing a frequency of each of the first filtered signal BPF_OUT1 and the second filtered signal BPF_OUT2. For example, the mixer MX may output the first demodulation signal MX_OUT1 by demodulating the first filtered signal BPF_OUT1, and output the second demodulation signal MX_OUT2 by demodulating the second filtered signal BFP_OUT2.

For example, the mixer MX may be implemented as a chopping circuit (or chopper) including two input terminals and two output terminals, and generate the first demodulation signal MX_OUT1 and the second demodulation signal MX_OUT2 by alternately connecting, to the two output terminals, the first filtered signal BPF_OUT1 and the second filtered signal BPF_OUT2, which are provided to the two input terminals.

The low pass filter LPF may output a first output signal LPF_OUT1 (or third filtered signal) and a second output signal LPF_OUT2 (or fourth filtered signal) by filtering noise distributed in a high frequency band of each of the first filtered signal BPF_OUT1 and the second filtered signal BPF_OUT2. When the analog front end AFE includes the mixer MX, the low pass filter LPF may output the first output signal LPF_OUT1 (or third filtered signal) and the second output signal LPF_OUT2 (or fourth filtered signal) by filtering noise distributed in a high frequency band of each of the first demodulation signal MX_OUT1 and the second demodulation signal MX_OUT2.

The analog-digital converter ADC may receive the first output signal LPF_OUT1 and the second output signal LPF_OUT2, and provide the signal processor DSP with a difference between the first output signal LPF_OUT1 and the second output signal LPF_OUT2 (e.g., a sensing value (or differential output value) SSn corresponding to |LPF_OUT1-LPF_OUT2|). For example, the analog-digital converter ADC may convert the first output signal LPF_OUT1 into a first output value, convert the second output signal LPF_OUT2 into a second output value, and output the sensing value SSn by differentiating the first output value and the second output value.

In accordance with an embodiment, the analog front end AFE may be implemented as a fully differential circuit (or fully differential analog front end) which maintains and outputs two differential signals from the amplifier CA to the front end of the analog digital converter ADC (i.e., the low pass filter LPF). The analog front end AFE provides two differential signals to the analog digital converter ADC, so that a dynamic range of the analog digital converter or a use range of the dynamic range can be increased doubly. Accordingly, the sensing sensitivity can be improved.

Figure 17:
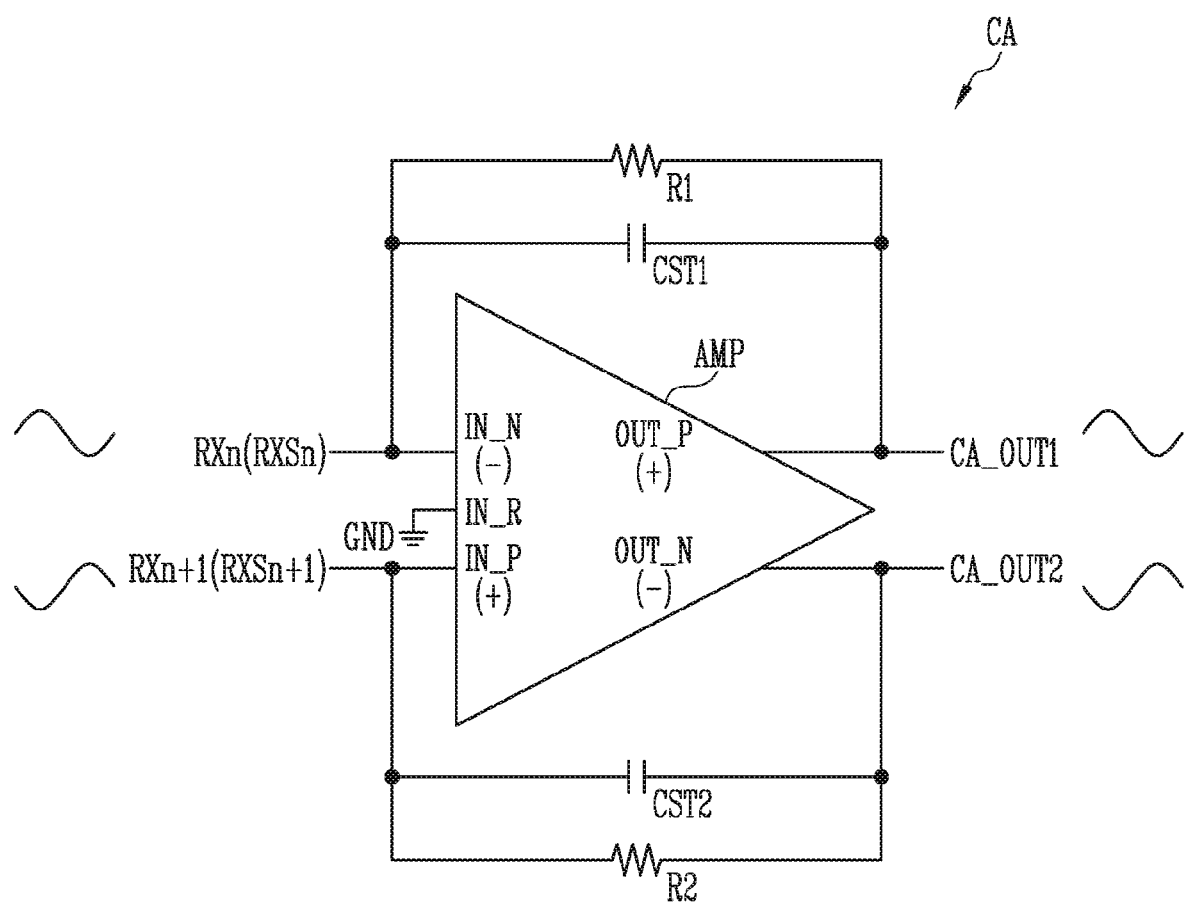
Figure 18:
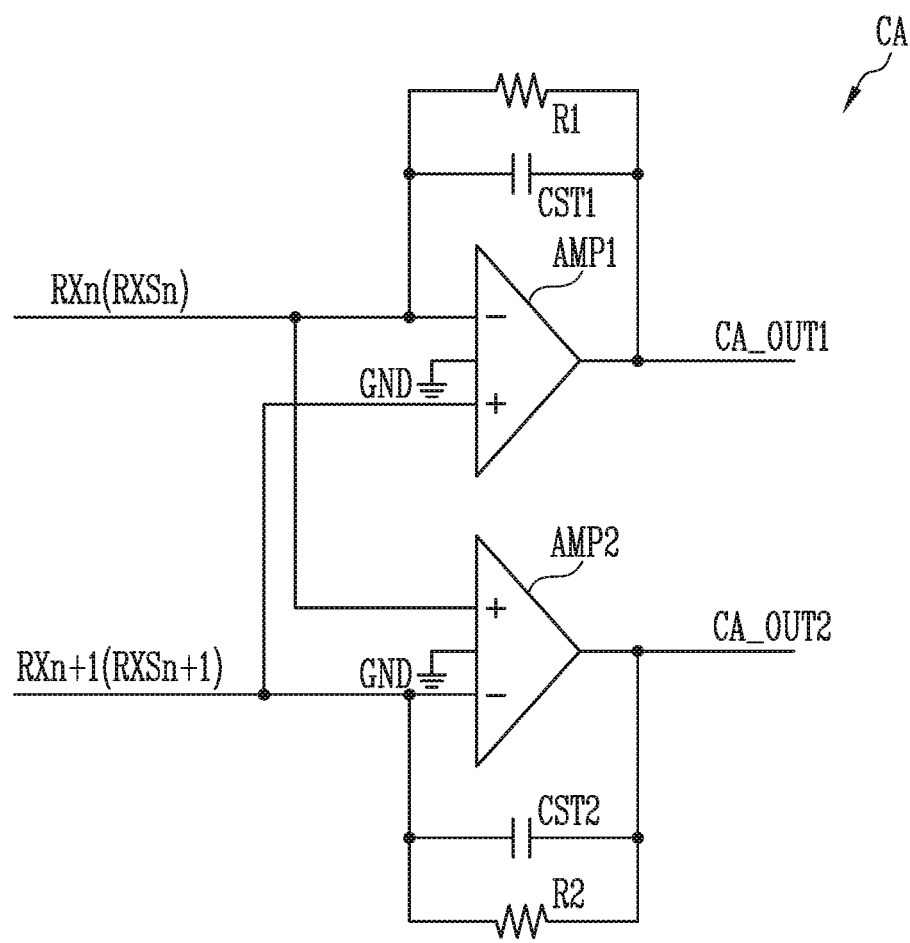
Figure 19:
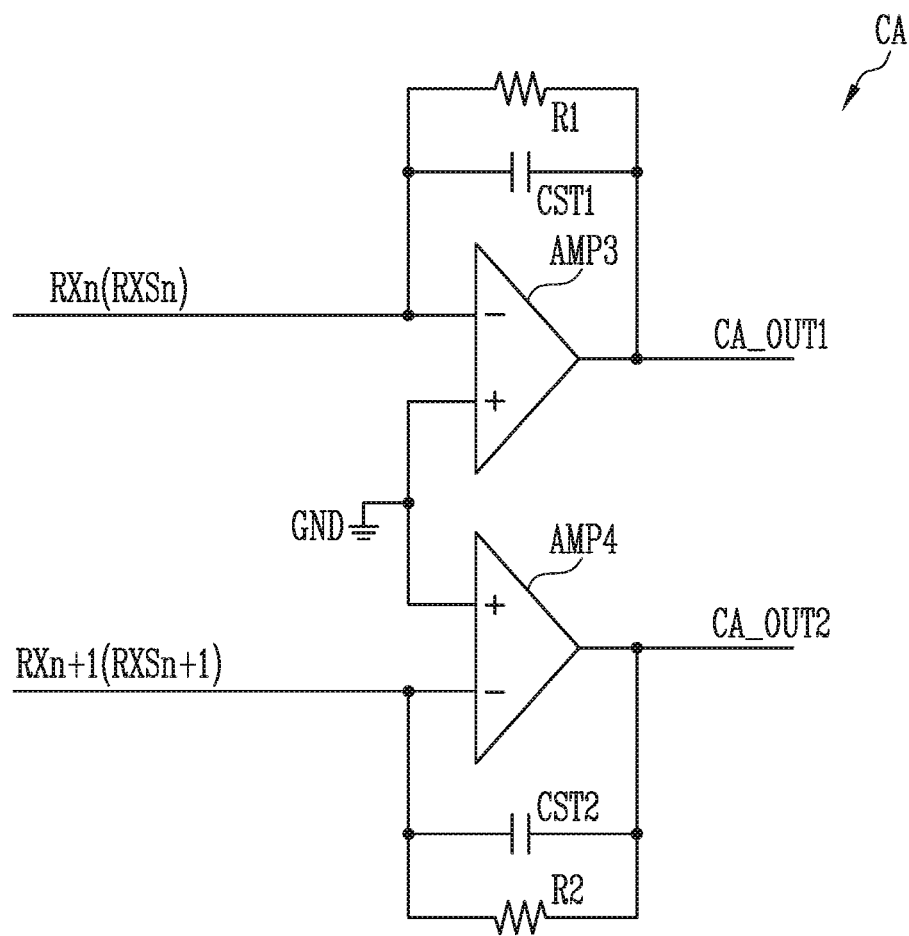

FIGS. 17 to 19 are circuit diagrams illustrating an amplifier included in the analog front end in accordance with an embodiment of the present disclosure.

Referring to FIG. 17, the amplifier CA may include an amplifier AMP, a first capacitor CST1, a first resistor R1, a second capacitor CST2, and a second resistor R2.

The amplifier AMP may include a first terminal IN_N (i.e., a negative input terminal ("−")), a second input terminal IN_P (i.e., a positive input terminal ("+")), a first output terminal OUT_P (i.e., a positive output terminal ("+")), and a second output terminal OUT_N (i.e., a negative output terminal ("−")). The amplifier AMP may further include a third input terminal IN_R (or reference input terminal), and a reference voltage GND may be applied to the third input terminal IN_R.

The first input terminal IN_N of the amplifier AMP may be connected to the nth sensor line RXn, and the nth sensing signal RXSn may be applied to the first input terminal IN_N of the amplifier AMP. The second input terminal IN_P of the amplifier AMP may be connected to the (n+1)th sensor line RXn+1, and the (n+1)th sensing signal RXSn+1 may be applied to the second input terminal IN_P of the amplifier AMP.

The first capacitor CST1 and the first resistor R1 may be connected in parallel between the first input terminal IN_N and the first output terminal OUT_P of the amplifier AMP. Therefore, the first differential signal CA_OUT1 corresponding to the difference between the nth sensing signal RXSn and the (n+1)th sensing signal RXSn+1 may be output through the first output terminal OUT_P of the amplifier AMP.

Similarly, the second capacitor CST2 and the second resistor R2 may be connected in parallel between the second input terminal IN_P and the second output terminal OUT_N of the amplifier AMP. The second resistor R2 (and the first resistor R1) may have a fixed resistance value, or may be configured as a variable resistor or switch. Therefore, the second differential signal CA_OUT2 corresponding to the difference between the (n+1)th sensing signal RXSn+1 and the nth sensing signal RXSn may be output through the second output terminal OUT_N. The second differential signal CA_OUT2 may have a waveform obtained by inverting the first differential signal CA_OUT1.

In some embodiments, referring to FIGS. 18 and 19, the amplifier AMP may include a plurality of amplifiers. In accordance with an embodiment, the amplifier CA may include a plurality of sub-amplifiers, and thus the resistance-capacitance delay can be further prevented.

FIG. 18 illustrates an amplifier CA in accordance with an embodiment of the present disclosure, and FIG. 19 illustrates a charge amplifier CA in accordance with an embodiment of the present disclosure.

Referring to FIG. 18, the charge amplifier CA in accordance with an embodiment of the present disclosure may include a first sub-amplifier AMP1 (or first amplifier) and a second sub-amplifier AMP2 (or second amplifier). The first sub-amplifier AMP1 may include input/output terminals corresponding to the second input terminal IN_P, the first input terminal IN_N, and the first output terminal OUT_P of the amplifier AMP. The nth sensing signal RXSn may be applied to a negative input terminal ("−") of the first sub-amplifier AMP1, and the (n+1)th sensing signal RXSn+1 may be applied to a positive input terminal ("+") of the first sub-amplifier AMP1. The first sub-amplifier AMP1 may amplify and output charges of the nth sensing signal RXSn with respect to the (n+1)th sensing signal RXSn+1 according to a connection configuration of the first resistor R1, the first capacitor CST1, and the first sub-amplifier AMP1. Similarly, the second sub-amplifier AMP2 may include input/output terminals corresponding to the second input terminal IN_P, the first input terminal IN_N, and the second output terminal OUT_N of the amplifier AMP. The nth sensing signal RXSn may be applied to a positive input terminal ("+") of the second sub-amplifier AMP2, and the (n+1)th sensing signal RXn+1 may be applied to a negative input terminal ("−") of the second sub-amplifier AMP2. The second sub-amplifier AMP2 may amplify and output charges of the (n+1)th sensing signal RXSn+1 with respect to the nth sensing signal RXSn according to a connection configuration of the second resistor R2, the second capacitor CST2, and the second sub-amplifier AMP2. The reference voltage GND may be provided as a driving voltage to the first sub-amplifier AMP2 and the second sub-amplifier AMP2, but the present disclosure is not limited thereto.

Referring to FIG. 19, the charge amplifier CA in accordance with an embodiment of the present disclosure may include a third sub-amplifier AMP3 and a fourth sub-amplifier AMP4. The nth sensing signal RXSn may be applied to a negative input terminal ("−") of the third sub-amplifier AMP3, and the reference voltage GND may be applied to a positive input terminal ("+") of the third sub-amplifier AmP3. The third sub-amplifier AMP3 may amplify and output charges of the nth sensing signal RXSn with respect to the reference voltage GND according to a connection configuration of the first resistor R, the first capacitor CST1, and the third sub-amplifier AMP3. Similarly, the reference voltage GND may be applied to a positive input terminal ("+") of the fourth sub-amplifier AMP4, and the (n+1)th sensing signal RXSn+1 may be applied to a negative input terminal ("−") of the fourth sub-amplifier AMP4. The fourth sub-amplifier AMP4 may amplify and output charges of the (n+1)th sensing signal RXSn+1 with respect to the reference voltage GND according to a connection configuration of the second resistor R2, the second capacitor CST2, and the fourth sub-amplifier AMP4.

Hereinafter, a mutual sensing operation of the sensor unit TSP will be described as one of embodiments with reference to FIGS. 20 to 22.

The mutual sensing operation may be performed during a mutual sensing period MSP. The mutual sensing period MSP may be a period in which the sensor unit TSP and the sensor driver SDV are driven in a mutual capacitance mode (i.e., a mutual capacitance sensing mode).

FIG. 20 is a diagram illustrating an embodiment of the mutual sensing operation. FIG. 21 is a diagram illustrating an embodiment of the mutual sensing operation. FIG. 22 is a diagram illustrating a third embodiment of the mutual sensing operation.

Referring to FIG. 20, during the mutual sensing period MSP, the mutual sensing operation in accordance with the first embodiment of the present disclosure may be performed. During the mutual sensing period MSP, the driving signal generator TXD may sequentially supply first sensing signals (e.g., driving signals TXS) to the first sensors TX. In accordance with an embodiment, after the first sensing signals are provided to the (1_1)th sensors TX1_1, the first sensing signals may be provided to the (1_2)th sensors TX1_2.

For example, the first sensing signals may be supplied twice (t1a and t2a) to the (1_1)th sensor line 122 of the (1_1)th sensors TX1_1. The first sensing signals may be supplied twice (t3a and t4a) to the (1_2)th sensor line 124 of the (1_1)th sensors TX1_1. The first sensing signals may be supplied twice (t5a and t6a) to the (1_3)th sensor line 126 of the (1_1)th sensors TX1_1. In some embodiments, the SDV may apply voltages to the (1_1)th sensor line 122, the (1_2)th sensor line 124, and the (1_3)th sensor line 126 during a time period between time points t1a and t2a, a time period between time points t3a and t4a, and a time period between time points t5a and t6a, respectively. The applied voltages may be the first sensing signals applied to the (1_1)th sensors TX1_1.

The first sensing signals may be supplied twice (t7a and t8a) to the (1_1)th sensor line 162 of the (1_2)th sensors TX1_2. The first sensing signals may be supplied twice (t9a and t10a) to the (1_2)th sensor line 164 of the (1_2)th sensors TX1_2. The first sensing signals may be supplied twice (t11a and t12a) to the (1_3)th sensor line 166 of the (1_2)th sensors TX1_2. In some embodiments, the SDV may apply voltages to the (1_1)th sensor line 162, the (1_2)th sensor line 164, and the (1_3)th sensor line 166 during a time period between time points t7a and t8a, a time period between time points t9a and t10a, and a time period between time points t11a and t12a, respectively. The applied voltages may be the first sensing signals applied to (1_2)th sensors TX1_2.

A number of times the first sensing signals are supplied to the (1_1)th sensors TX1_1 and the (1_2)th sensors TX1_2 may be greater than twice in some embodiments.

Each of the first sensing signals may correspond to a rising transition and/or a falling transition. For example, a first sensing signal at a time t1a may correspond to the rising transition. For example, the first sensing signal at the time t1a may rise from a low level to a high level. A first sensing signal at a time t2a may correspond to the falling transition. For example, the first sensing signal at the time t2a may fall from the high level to the low level.

On the sensing area SA, mutual capacitances between the first sensors TX and the second sensors RX may be different from each other according to a position of an object such as a user finger. Based on this, a touch position of the object providing a touch input may be detected.

In accordance with an embodiment, when a first sensing signal with respect to the first sensing area SA1 is provided, any first sensing signal with respect to the second sensing area SA2 may not be provided. Similarly, when a first sensing signal with respect to the second sensing area SA2 is provided, any first sensing signal with respect to the first sensing area SA1 may not be provided. Accordingly, partial supply of a first sensing signal to one of the first sensing area SA1 and the second sensing area SA2 may reduce power consumption compared to full supply of a first sensing signal to both the first sensing area SA1 and the second sensing area SA2.

Referring to FIG. 21, during the mutual sensing period MSP, the mutual sensing operation in accordance with an embodiment of the present disclosure may be performed. During the mutual sensing period MSP, the driving signal generator TXD may provide first sensing signals to a plurality of grouped sensor lines.

In accordance with an embodiment, the driving signal generator TXD may provide first sensing signals to a first group of sensor lines including the (1_1)th sensor line 122, the (1_2)th sensor line 124, and the (1_3)th sensor line 126 of the (1_1)th sensors TX1_1 in a first sensing time period t1b to t10b. The driving signal generator TXD may provide first sensing signals to a second group of sensor lines including the (1_1)th sensor line 162, the (1_2)th sensor line 164, and the (1_3)th sensor line 166 of the (1_2)th sensors TX1_2 in a second sensing time period t10b to t19b.

In accordance with an embodiment, the first sensing time period t1b to t10b may be a time period in which a touch input to the first sensing area SA1 can be sensed, and the second sensing time period t10b to t19b may be a time period in which a touch input to the second sensing area SA2 can be sensed.

According to the mutual sensing operation in accordance with the second embodiment (FIG. 21), after the first sensing signals with respect to the first group of sensor lines including the (1_1)th sensor line 122, the (1_2)th sensor line 124, and the (1_3)th sensor line 126 of the (1_1)th sensors TX1_1 are provided, the first sensing signals may be provided to the second group of sensor lines including the (1_1)th sensor line 162, the (1_2)th sensor line 164, and the (1_3)th sensor line 166 of the (1_2)th sensors TX1_2.

For example, the first sensing signals with respect to the (1_1)th sensors TX1_1 may be provided in the time period t1b to t10b, and the first sensing signals with respect to the (1_2)th sensors TX1_2 may be provided in the time period t10b to t19b.

In accordance with an embodiment of FIG. 21, like the embodiment of FIG. 20, times at which the first sensing signal is provided to the first sensing area SA1 and the second sensing area SA2 are different from each other, thereby reducing power consumption. The first sensing area SA1 and the second sensing area SA2 may be dividedly driven.

For example, the sensor unit TSP may sense a touch input to the second sensing area SA2 without sensing any touch input to the first sensing area SA1, and sense a touch input to the first sensing area SA1 without sensing any touch input to the second sensing area SA2. A time at which information on a touch input is acquired in the first sensing area SA1 may be different from that at which information on a touch input is acquired in the second sensing area SA2.

The (1_1)th sensor line 122, the (1_2)th sensor line 124, and the (1_3)th sensor line 126 are disposed on different row lines, which has been described above.

In order to thoroughly detect a position at which a touch input is provided, a first phase sensing signal 1120 and/or a second phase sensing signal 1140 may be provided to each of the (1_1)th sensor line 122, the (1_2)th sensor line 124, and the (1_3)th sensor line 126 of the (1_1)th sensors TX1_1, which are grouped. The first phase sensing signal 1120 and the second phase sensing signal 1140 may correspond to the first sensing signal.

In FIGS. 21 and 22, the first phase sensing signal 1120 is indicated by an alternated long and short dash line, and the second phase sensing signal 1140 is indicated by an alternated long and two short dashes line.

In accordance with an embodiment, the first phase sensing signal 1120 and the second phase sensing signal 1140 may be defined to be distinguished from each other with respect to predetermined periods 2220, 2240, 2260, 2320, 2340, and 2360. In an example, the second phase sensing signal 1140 provided to the (1_1)th sensor line 122 of the (1_1)th sensors TX1_1 may be designated, including a first sensing signal provided in a first period 2220. The phase sensing signals 1120 and 1140 in the other periods may be defined similarly thereto.

For example, the first sensing signal provided to the (1_1)th sensor line 122 of the (1_1)th sensors TX1_1 in the first period 2220 may be the second phase sensing signal 1140. Each of first sensing signals provided to the (1_2)th sensor line 124 and the (1_3)th sensor line 126 of the (1_1)th sensors TX1_1 in the first period 2220 may be the first phase sensing signal 1120.

In accordance with an embodiment, the first phase sensing signal 1120 and the second phase sensing signal 1140 may have phases different from each other. The first phase sensing signal 1120 and the second phase sensing signal 1140 may have phases opposite to each other.

In accordance with an embodiment, in a corresponding time period, the second phase sensing signal 1140 may have the falling transition at a time at which the first phase sensing signal 1120 has the rising transition. In a corresponding time period, the second phase sensing signal 1140 may have the rising transition at a time at which the first phase sensing signal 1120 has the falling transition.

For example, in the first period 2220 (t1b to t4b) (e.g., a first time period), the first phase sensing signal 1120 may have the rising transition at a time t2b and have the falling transition at a time t3b.

In accordance with an embodiment, in the first period 2220 (t1b to t4b), the second phase sensing signal 1140 may be provided to the (1_1)th sensor line 122 of the (1_1)th sensors TX1_1, and the first phase sensing signal 1120 may be provided to the (1_2)th sensor line 124 and the (1_3)th sensor line 126 of the (1_1)th sensors TX1_1.

In accordance with an embodiment, in a second period 2240 (t4b to t7b) (e.g., a second time period), the second phase sensing signal 1140 may be provided to the (1_2)th sensor line 124 of the (1_1)th sensors TX1_1, and the first phase sensing signal 1120 may be provided to the (1_1)th sensor line 122 and the (1_3)th sensor line 126 of the (1_1)th sensors TX1_1.

In accordance with an embodiment, in a third period 2260 (t7b to t10b), the second phase sensing signal 1140 may be provided to the (1_3)th sensor line 126 of the (1_1)th sensors TX1_1, and the first phase sensing signal 1120 may be provided to the (1_1)th sensor line 122 and the (1_2)th sensor line 124 of the (1_1)th sensors TX1_1.

The second phase sensing signal 1140 may be provided to the sensor lines 122, 124, and 126 of each of the (1_1)th sensors TX1_1 at different times, so that the position at which a touch input is provided can be sorted. In an example, a touch position in the second direction DR2 as a direction in which the sensor lines 122, 124, and 126 are adjacent to each other may be determined.

In accordance with an embodiment, the first phase sensing signal 1120 and the second phase sensing signal 1140 may be provided to each of the (1_1)th sensor line 162, the (1_2)th sensor line 164, and the (1_3)th sensor line 166 of the (1_2)th sensors TX1_2, which are grouped.

For example, in a fourth period 2320 (t10b to t13b) (e.g., a third time period), the second phase sensing signal 1140 may be provided to the (1_1)th sensor line 162 of the (1_2)th sensors TX1_2, and the first phase sensing signal 1120 may be provided to the (1_2)th sensor line 164 and the (1_3)th sensor line 166 of the (1_2)th sensors TX1_2.

In a fifth period 2340 (t13b to t16b) (e.g., a fourth time period), the second phase sensing signal 1140 may be provided to the (1_2)th sensor line 164 of the (1_2)th sensors TX1_2, and the first phase sensing signal 1120 may be provided to the (1_1)th sensor line 162 and the (1_3)th sensor line 166 of the (1_2)th sensors TX1_2.

In a sixth period 2360 (t16b to t19b), the second phase sensing signal 1140 may be provided to the (1_3)th sensor line 166 of the (1_2)th sensors TX1_2, and the first phase sensing signal 1120 may be provided to the (1_1)th sensor line 162 and the (1_2)th sensor line 164 of the (1_2)th sensors TX1_2.

As described above, the second phase sensing signal 1140 may be provided to the sensor lines 162, 164, and 166 of each of the (1_2)th sensors TX1_2 at different times, so that various positions at which a touch input is provided can be sorted or can be distinguished from each other. In an example, a touch position in the second direction DR2 as a direction in which the sensor lines 122, 124, and 126 are adjacent to each other may be determined.

Referring to FIG. 22, during the mutual sensing period MSP, the mutual sensing operation in accordance with the third embodiment of the present disclosure may be performed.

In the mutual sensing period MSP, the mutual sensing operation in accordance with the third embodiment of the present disclosure, portions different from those in the mutual sensing operation in accordance with the second embodiment of the present disclosure will be described.

The mutual sensing operation in accordance with the third embodiment of the present disclosure is different from the mutual sensing operation in accordance with the second embodiment of the present disclosure, in that the first sensing signal with respect to the second sensing area SA2 is partially provided while the first sensing signal with respect to the first sensing area SA1 is applied.

For example, in accordance with the second embodiment, the first sensing signal with respect to the second sensing area SA2 may not be provided to the (1_2)th sensors TX1_2 while the first sensing signal with respect to the first sensing area SA1 is provided to the (1_1)th sensors TX1_1.

As compared with this, in accordance with the third embodiment, a third phase sensing signal 1160 may be provided to the (1_2)th sensors TX1_2 in the time period t1b to t10b (2220, 2240, and 2260) in which first sensing signals with respect to the (1_1)th sensors TX1_1 are provided. Similarly, the third phase sensing signal 1160 may be provided to the (1_1)th sensors TX1_1 in the time period t10b to t19b (2320, 2340, and 2360) in which first sensing signals with respect to the (1_2)th sensors TX1_2 are provided.

In FIG. 22, the third phase sensing signal 1160 is indicated by a narrow dotted line, as compared with the first phase sensing signal 1120 and the second phase sensing signal 1140.

In accordance with an embodiment, the third phase sensing signal 1160 may be defined to be distinguished from each other with respect to predetermined periods 2220, 2240, 2260, 2320, 2340, and 2360. For example, the third phase sensing signal 1160 provided to the (1_1)th sensor line 162 of the (1_2)th sensors TX1_2 may be designated, including a first sensing signal provided in a first period 2220. The third phase sensing signal 1160 in the other periods may be defined similarly thereto.

In accordance with an embodiment, when the second phase sensing signal 1140 is provided to a sensor line of any one of the (1_1)th sensors TX1_1 with respect to the first sensing area SA1, the third phase sensing signal 1160 may be provided to a sensor line of the (1_2)th sensors TX1_2 formed on the same line as the sensor line to which the second phase sensing signal 1140 is provided.

For example, at the same time as that at which the second phase sensing signal 1140 is provided to the (1_1)th sensor line 122 of the (1_1)th sensors TX1_1, the third phase sensing signal 1160 may be provided to (1_1)th sensor line 162 of the (1_2)th sensors TX1_2 disposed on the same row as the (1_1)th sensor line 122 of the (1_1)th sensors TX1_1.

Similarly, when the second phase sensing signal 1140 is provided to a sensor line of any one of the (1_2)th sensors TX1_2 with respect to the second sensing area SA2, the third phase sensing signal 1160 may be provided to a sensor line of the (1_1)th sensors TX1_1 formed on the same line as the sensor line to which the second phase sensing signal 1140 is provide.

For example, at the same time as than at which the second phase sensing signal 1140 is provided to the (1_1)th sensor line 162 of the (1_2)th sensors TX1_2, the third phase sensing signal 1160 may be provided to the (1_1)th sensor line 122 of the (1_1)th sensors TX1_1 disposed on the same row as the (1_1)th sensor line 162 of the (1_2)th sensors TX1_2.

In accordance with an embodiment, the second phase sensing signal 1140 may have a phase substantially equal to that of the third phase sensing signal 1160. For example, the second phase sensing signal 1140 and the third phase sensing signal 1160 may have magnitudes that are equal to or different from each other, but times of the rising transition and the falling transition may be equal to each other.

For example, the second phase sensing signal 1140 and the third phase sensing signal 1160 may have the falling transition when the first phase sensing signal 1120 has the rising transition. The second phase sensing signal 1140 and the third phase sensing signal 1160 may have the rising transition when the first phase sensing signal 1120 has the falling transition.

When a sensing operation is performed on the first sensing area SA1, the second phase sensing signal 1140 may be provided to the (1_1)th sensor line 122 of the (1_1)th sensors TX1_1, and the first phase sensing signal 1120 may be provided to the (1_2)th sensor line 124 and the (1_3)th sensor line 126 of the (1_1)th sensors TX1_1. The rising transition or the falling transition may be provided to the (1_1)th sensor lines 122 and 162 of the (1_1)th sensors TX1_1 and the (1_2)th sensors TX1_2 at predetermined times t1b, t2b, t3b, and t4b.

When the sensing operation is performed on the first sensing area SA1, the second phase sensing signal 1140 may be provided to the (1_2)th sensor line 124 of the (1_1)th sensors TX1_1, the third phase sensing signal 1160 may be provided to the (1_2)th sensor line 164 of the (1_2)th sensors TX1_2, and the first phase sensing signal 1120 may be provided to the (1_1)th sensor line 122 and the (1_3)th sensor line 126 of the (1_1)th sensors TX1_1. The rising transition or the falling transition may be provided to the (1_2)th sensor lines 124 and 164 of the (1_1)th sensors TX1_1 and the (1_2)th sensors TX1_2 at predetermined times t4b, t5b, t6b, and t7b.

When the sensing operation is performed on the first sensing area SA1, the second phase sensing signal 1140 may be provided to the (1_3)th sensor line 126 of the (1_1)th sensors TX1_1, the third phase sensing signal 1160 may be provided to the (1_3)th sensor line 166 of the (1_2)th sensors TX1_2, and the first phase sensing signal 1120 may be provided to the (1_1)th sensor line 122 and the (1_2)th sensor line 124 of the (1_1)th sensors TX1_1. The rising transition or the falling transition may be provided to the (1_3)th sensor lines 126 and 166 of the (1_1)th sensors TX1_1 and the (1_2)th sensors TX1_2 at predetermined times t7b, t8b, t9b, and t10b.

When a sensing operation is performed on the second sensing operation SA2, the second phase sensing signal 1140 may be provided to the (1_1)th sensor line 162 of the (1_2)th sensors TX1_2, the third phase sensing signal 1160 may be provided to the (1_1)th sensor line 122 of the (1_1)th sensors TX1_1, and the first phase sensing signal 1120 may be provided to the (1_2)th sensor line 164 and the (1_3)th sensor line 166 of the (1_2)th sensors TX1_2. The rising transition or the falling transition may be provided to the (1_1)th sensor lines 122 and 162 of the (1_1)th sensors TX1_1 and the (1_2)th sensors TX1_2 at predetermined times t1b, t2b, t3b, and t4b.

When the sensing operation is performed on the second sensing area SA2, the second phase sensing signal 1140 may be provided to the (1_2)th sensor line 164 of the (1_2)th sensors TX1_2, the third phase sensing signal 1160 may be provided to the (1_2)th sensor line 124 of the (1_1)th sensors TX1_1, and the first phase sensing signal 1120 may be provided to the (1_1)th sensor line 162 and the (1_3)th sensor line 166 of the (1_2)th sensors TX1_2. The rising transition or the falling transition may be provided to the (1_2)th sensor lines 124 and 164 of the (1_1)th sensors TX1_1 and the (1_2)th sensors TX1_2 at predetermined times t4b, t5b, t6b, and t7b.

When the sensing operation is performed on the second sensing area SA2, the second phase sensing signal 1140 may be provided to the (1_3)th sensor line 166 of the (1_2)th sensors TX1_2, the third phase sensing signal 1160 may be provided to the (1_3)th sensor line 126 of the (1_1)th sensors TX1_1, and the first phase sensing signal 1120 may be provided to the (1_1)th sensor line 162 and the (1_2)th sensor line 164 of the (1_2)th sensors TX1_2. The rising transition or the falling transition may be provided to the (1_3)th sensor lines 126 and 166 of the (1_1)th sensors TX1_1 and the (1_2) sensors TX1_2 at predetermined times t7b, t8b, t9b, and t10b.

In accordance with an embodiment, when the sensing operation is performed on the first sensing area SA1, separate object sensing may not be performed even when the first sensing signal is provided to the (1_2)th sensors TX1_2.

In accordance with an embodiment, while the sensing operation is performed on the first sensing area SA1, the third phase sensing signal 1160 may be provided to the (1_2)th sensors TX1_2 of the second sensing area SA2, so that noise occurring in the display panel PNL can be reduced.

Experimentally, in order to perform the sensing operation on the sensing area SA, when first sensing signals are provided to the first sensors TX, a parasitic capacitance is formed at a cathode electrode (e.g., the second electrode ELT2) formed at the front surface of the display panel PNL, and therefore, noise may occur in an electrical signal provided to the display panel PNL.

However, in accordance with an embodiment, when a sensing operation on a partial area (e.g., the first sensing area SA1) in the sensing area SA is performed, and any sensing operation on the other area (e.g., the second sensing area SA2) is not performed, influence of the first phase sensing signal 1120 entirely generated in the display pane PNL may be decreased by the third phase sensing signal 1160 provided to the other area. For example, with respect to the front surface of the display panel PNL, an electrical signal having influence on the cathode electrode of the display panel PNL may be defined by the whole of the first sensing area SA1 and the second sensing area SA2. Consequently, with respect to the whole of the sensing area SA, the influence of the first phase sensing signal 1120 can be cancelled by the third phase sensing signal 1160 having a phase opposite to that of the first phase sensing signal 1120, and accordingly, noise occurring in the display panel PNL can be reduced.

Next, a sensor unit TSP included in the display device DD in accordance with a second embodiment of the present disclosure will be described with reference to FIG. 23. Descriptions of portions described above will be omitted or simplified, and portions different from those described above will be described.

FIG. 23 is a plan view schematically illustrating a sensor unit in accordance with a second embodiment of the present disclosure.

The sensor unit TSP in accordance with the second embodiment of the present disclosure is different from the sensor unit TSP in accordance with the first embodiment of the present disclosure, in that some of the (2_1)th sensors RX2_1 disposed in the first sensing area SA1 are not electrically connected to the (2_2)th sensors RX2_2.

In accordance with an embodiment, an area of the first sensing area SA1 may be different from that of the second sensing area SA2. The area of the first sensing area SA1 may be greater than that of the second sensing area SA2. For example, a number of sensor lines of the (2_1)th sensors RX2_1 provided in the first sensing area SA1 may be greater than that of sensor lines of the (2_2)th sensors RX2_2 provided in the second sensing area SA2.

In accordance with an embodiment, some of the (2_1)th sensors RX2_1 may be electrically connected to the (2_2)th sensors RX2_2 through the connection pattern 320, and other some of the (2_1)th sensors RX2_1 may not be electrically connected to (or electrically separated from) the (2_2)th sensors RX2_2. Non-connection sensor lines 152 and 154 may correspond to sensor lines of the (2_1)th sensors RX2_1.

In accordance with an embodiment, a first non-connection sensor line 152 may be electrically connected to the sensor driver SDV through the (3_4)th line 348. A second non-connection sensor line 154 may be electrically connected to the sensor driver SDV through the (3_3)th line 346.

In accordance with an embodiment, the third line 340 may further include a (3_5)th line 349. The (3_5)th line 349 may electrically connect the (2_1)th sensor line 142 of the (2_1)th sensors RX2_1 to the sensor driver SDV.

Next, a sensor unit TSP included in the display device DD in accordance with a third embodiment of the present disclosure will be described with reference to FIGS. 24 and 25. Descriptions of portions described above will be omitted or simplified, and portions different from those described above will be described.

FIG. 24 is a plan view schematically illustrating a sensor unit in accordance with a third embodiment of the present disclosure.

FIG. 25 is a perspective view schematically illustrating a display device in accordance with a third embodiment of the present disclosure.

The sensor unit TSP in accordance with the third embodiment of the present disclosure is different from the sensor units TSP in accordance with the first and second embodiments of the present disclosure, in that the sensor unit TSP in accordance with the third embodiment of the present disclosure further includes a third sensing area SA3.

In accordance with an embodiment, the sensing area SA may further include the third sensing area SA3. The third sensing area SA3 may be disposed at one side of the first sensing area SA1. As described above, the second sensing area SA2 may be disposed at the other side of the first sensing area SA1. The third sensing area SA3 may be distinguished from the first sensing area SA1 by a second division line 110. Structural features with respect to the second division line 110 may be construed similarly to the sensor unit TSP in accordance with the first embodiment of the present disclosure.

In accordance with an embodiment, the second sensors RX may further include (2_3)th sensors RX2_3. The (2_3)th sensors RX2_3 may refer to sensor lines with respect to the third sensing area SA3.

In accordance with an embodiment, the (2_3)th sensors RX2_3 may include non-connection sensor lines 152 and 154. The non-connection sensor lines 152 and 154 disposed in the third sensing area SA3 may not be connected to the connection pattern 320.

In accordance with an embodiment, the third line 340 may further include a (3_5)th line 349. The (3_5)th line 349 may electrically connect the (2_1)th sensor line 142 of the (2_1)th sensors RX2_1 to the sensor driver SDV.

Referring to FIG. 25, the display device DD may be folded with respect to a first division line 100 for distinguishing the first sensing area SA1 and the second sensing area SA2 from each other. The display device DD may be folded with respect to the second division line 110 for distinguishing the first sensing area SA1 and the third sensing area SA3 from each other. For example, the display device DD in accordance with the third embodiment of the present disclosure may be folded with respect to both the first division line 100 and the second division line 110, and be folded twice.

In accordance with the present disclosure, there can be provided a display device in which process cost is reduced, and the degree of freedom of a line design is increased.

In accordance with the present disclosure, there can be provided a display device in which power consumption can be reduced when a driving operation is performed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used alone or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:
1. A display device comprising:
a sensing area with a first sensing area and a second sensing area spaced apart from the first sensing area in a first direction, and a non-sensing area, wherein the non-sensing area includes a division region interposed between the first sensing area and the second sensing area, and
wherein the division region extends along a straight line extending in a second direction different from the first direction;
a light emitting element emitting light;
a sensor unit including:
a plurality of first sensor electrodes disposed in the first sensing area and extending in the first direction,
a plurality of second sensor electrodes disposed in the second sensing area and extending in the first direction,
a plurality of third sensor electrodes disposed in the first sensing area and extending in the second direction,
a plurality of fourth sensor electrodes disposed in the second sensing area and extending in the second direction, and
a connection pattern disposed in the non-sensing area,
wherein the connection pattern electrically connects the plurality of third sensor electrodes to the plurality of fourth sensor electrodes, and wherein
the connection pattern extends from the plurality of third sensor electrodes to the plurality of fourth sensor electrodes outside the division region; and
a sensor driver configured to drive the sensor unit,
wherein the plurality of first sensor electrodes include a first row sensor electrode and a second row sensor electrode,
wherein the sensor driver is configured such that the sensor driver provides:
 during a first time period, a first phase sensing signal and a second phase sensing signal to the second row sensor electrode and the first row sensor electrode, respectively, and
 during a second time period after the first time period, the second phase sensing signal and the first phase sensing signal to the second row sensor electrode and the first row sensor electrode, respectively, and
wherein the first phase sensing signal and the second phase sensing signal are different from each other.

2. The display device of claim 1, further comprising:
a sensor driver configured to drive the sensor unit,
wherein the sensor driver is disposed at a first side of the sensing area, and
wherein the connection pattern is disposed at a second side, opposite to the first side, of the sensing area.

3. The display device of claim 1,
wherein the connection pattern includes a plurality of connection lines, and
wherein each of the plurality of connection lines electrically connects a corresponding third sensor electrode of the plurality of third sensor electrodes to a corresponding fourth sensor electrode of the plurality of fourth sensor electrodes.

4. The display device of claim 3, further comprising:
a sensor driver configured to drive the sensor unit,
wherein a first end of each of the plurality of first sensor electrodes is connected to the sensor driver and a second end of each of the plurality of first sensor electrodes is adjacent to the division region,
wherein a third end of each of the plurality of second sensing electrodes is connected to the sensor driver and a fourth end of each of the plurality of second sensing electrodes is adjacent to the division region,
wherein the first sensing area and the second sensing area are separated from each other by the division region,
wherein each of the plurality of connection lines includes a first portion extending along a straight line extending in the first direction, a second portion extending from a first end of the first portion and extending along a straight line extending in the second direction, and a third portion extending from a second end of the first portion and extending along a straight line extending in the second direction,
wherein the second portion of each of the plurality of connection lines is electrically connected to a corresponding third sensor electrode of the plurality of third sensor electrodes, and
wherein the third portion of each of the plurality of connection lines is electrically connected to a corresponding fourth sensor electrode of the plurality of fourth sensor electrodes.

5. The display device of claim 1, further comprising:
a plurality of fifth sensor electrodes disposed in the first sensing area and extending in the second direction,
wherein the connection pattern is not electrically connected to the plurality of fifth sensor electrodes.

6. The display device of claim 1, further comprising:
a third sensing area adjacent to the first sensing area and being spaced apart from the first sensing area by a second division region extending along a straight line extending in the second direction; and
a plurality of fifth sensor electrodes disposed in the third sensing area and extending along a straight line extending in the second direction,
wherein the connection pattern is not electrically connected to the plurality of fifth sensor electrodes.

7. The display device of claim 1,
wherein the first sensing area and the second sensing area are separated from each other by the division region,
wherein each of the plurality of first sensor electrodes includes:
 a plurality of first cell electrodes connected with each other in the first direction and each first cell electrode having a first shape, and
 a second cell electrode having a second shape different from the first shape and connected to a cell electrode, closest to the division region, among the plurality of first cell electrodes,
wherein the second cell electrode is disposed between the division region and the cell electrode, closest to the division region, among the plurality of first cell electrodes,
wherein each of the plurality of second sensor electrodes includes:
 a plurality of third cell electrodes connected with each other in the first direction and each third cell electrode having the first shape, and
 a fourth cell electrode having a third shape different from the first shape and connected to a cell electrode, closest to the division region, among the plurality of third cell electrodes,
wherein the fourth cell electrode is disposed between the division region and the cell electrode, closest to the division region, among the plurality of third cell electrodes, and
wherein the second shape of the second cell electrode and the third shape of the fourth cell electrode are mirror-symmetric with respect to the division region.

8. The display device of claim 7,
wherein, when a touch input to the first sensing area is provided, a ground signal is provided to the second cell electrode adjacent to the division region, and wherein, when a touch input to the second sensing area is provided, the ground signal is provided to the fourth cell electrode.

9. The display device of claim 7,
wherein, when a touch input to the first sensing area is sensed, the second cell electrode has a floating state, and
wherein, when a touch input to the second sensing area is sensed, the fourth cell electrode has the floating state.

10. The display device of claim 1, further comprising:
a sensor driver configured to drive the sensor unit,
wherein the sensor unit is configured to:
sense a touch input to the second sensing area without sensing touch input to the first sensing area, and
sense a touch input to the first sensing area without sensing touch input to the second sensing area.

11. The display device of claim 1,
wherein the plurality of second sensor electrodes include a third row sensor electrode and a fourth row sensor electrode,
wherein the sensor driver is configured such that the sensor driver further provide a third phase sensing signal to the third row sensor electrode during the first time period, and
wherein the second phase sensing signal and the third phase sensing signal have the same rising transition as each other at the first time period or the same falling transition as each other at the first time period.

12. The display device of claim 11,
wherein falling transition of each of the second phase sensing signal and the third phase sensing signal and rising transition of the first phase sensing signal occur at the same time as each other, and
wherein rising transition of each of the second phase sensing signal and the third phase sensing signal and falling transition of the first phase sensing signal occur at the same time as each other.

13. The display device of claim 11,
wherein the plurality of second sensor electrodes include a third row sensor electrode and a fourth row sensor electrode,
wherein the sensor driver is configured such that the sensor driver further provides:
the first phase sensing signal and the second phase sensing signal to the fourth row sensor electrode and the third row sensor electrode, respectively, during a third time period; and
the first phase sensing signal and the second phase sensing signal to the third row sensor electrode and the fourth row sensor electrode, respectively, during a fourth time period after the third time period, and
wherein during the first time period and the second time period, the first sensing area is configured to sense a touch input on the first sensing area, and
wherein during the third time period and the fourth time period, the second sensing area is configured to sense a touch input on the second sensing area.

14. The display device of claim 13,
wherein the first row sensor electrode and the third row sensor electrode extend along a first straight line extending in the first direction,
wherein the second row sensor electrode and the fourth row sensor electrode extend along a second straight line extending in the first direction, and
wherein the first straight line and the second straight line are spaced apart from each other in the second direction.

15. The display device of claim 1, further comprising:
a sensor driver configured to drive the sensor unit,
wherein the sensor driver is configured to provide the plurality of first sensor electrodes with a driving signal having an AC voltage of a sinusoidal wave.

16. The display device of claim 1, further comprising:
a sensor driver configured to drive the sensor unit,
wherein the sensor driver includes:
a driving signal generator electrically connected to the plurality of first sensor electrodes and the plurality of second sensor electrodes,
an analog front end electrically connected to the plurality of third sensor electrodes and the plurality of fourth sensor electrodes, and
a signal processor electrically connected to the analog front end, and wherein the analog front end includes a plurality of differential amplifiers.

17. The display device of claim 1,
wherein the division region separates the first sensing area and the second sensing area from each other, and
wherein the display device is foldable, bendable or slidable with respect to the division region.

18. A display device comprising:
a first sensing area and a second sensing area;
a light emitting element;
a plurality of (1_1)th sensors and a plurality of (2_1)th sensors, disposed in the first sensing area;
a plurality of (1_2)th sensors and a plurality of (2_2)th sensors, disposed in the second sensing area;
a plurality of connection patterns electrically connecting the plurality of the (2_1)th sensors and the plurality of (2_2)th sensors to each other;
a division region separating the first sensing area and the second sensing area from each other, wherein, when viewed in a plan view, the plurality of (1_1)th sensors and the plurality of (1_2)th sensors are separated from each other by the division region;
a sensor driver configured to drive the plurality of (1_1)th sensors, the plurality of (2_1)th sensors, the plurality of (1_2)th sensors, and the plurality of (2_2)th sensors,
wherein the plurality of (1_1)th sensors include a first row sensor electrode and a second row sensor electrode, the sensor driver is configured to provide, during a first time period, a first phase sensing signal and a second phase sensing signal to the second row sensor electrode and the first row sensor electrode, respectively, and the first phase sensing signal and the second phase sensing signal are different from each other, and
wherein the sensor driver is configured to further provide the second phase sensing signal and the first phase sensing signal to the second row sensor electrode and the first row sensor electrode, respectively, during a second time period after the first time period.

* * * * *